US012691852B2

(12) United States Patent
Takenaka et al.

(10) Patent No.: US 12,691,852 B2
(45) Date of Patent: Jul. 28, 2026

(54) BRAKE PEDAL DEVICE

(71) Applicant: DENSO CORPORATION, Kariya-city (JP)

(72) Inventors: Kenichiro Takenaka, Kariya-city (JP); Masashi Arao, Kariya-city (JP); Etsugo Yanagida, Kariya-city (JP); Yuki Matsunaga, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/912,948

(22) Filed: Oct. 11, 2024

(65) Prior Publication Data

US 2025/0033609 A1     Jan. 30, 2025

Related U.S. Application Data

(63) Continuation of application No. PCT/JP2023/012235, filed on Mar. 27, 2023.

(30) Foreign Application Priority Data

Apr. 29, 2022     (JP) .................................. 2022-075567

(51) Int. Cl.
B60T 7/06          (2006.01)
G05G 5/05          (2006.01)

(52) U.S. Cl.
CPC .................. B60T 7/06 (2013.01); G05G 5/05 (2013.01); G05G 2505/00 (2013.01)

(58) Field of Classification Search
CPC .......... G05G 1/327; G05G 1/323; G05G 1/32; B60T 7/065
See application file for complete search history.

(56) References Cited

U.S. PATENT DOCUMENTS

| | | | | |
|---|---|---|---|---|
| 5,983,746 A | * | 11/1999 | Nawata .................... | B60T 7/065 |
| | | | | 180/274 |
| 2018/0232003 A1 | * | 8/2018 | Tsuguma ................. | G05G 1/44 |
| 2020/0325931 A1 | * | 10/2020 | Song ...................... | G05G 25/02 |

FOREIGN PATENT DOCUMENTS

| | | | | | |
|---|---|---|---|---|---|
| DE | 19501680 A1 | * | 8/1996 | ............. | B60R 21/09 |
| DE | 10040043 C1 | * | 8/2001 | ............. | G05G 1/327 |
| DE | 102011082145 A1 | * | 3/2013 | ............. | B60R 21/09 |
| DE | 102011082146 A1 | * | 3/2013 | ............. | G05G 1/327 |
| DE | 102011082154 A1 | * | 3/2013 | ............. | B60R 21/09 |
| DE | 102017200989 A1 | * | 7/2018 | ............. | G05G 1/327 |
| JP | 6148642 B2 | | 6/2017 | | |

* cited by examiner

*Primary Examiner* — Daniel D Yabut
(74) *Attorney, Agent, or Firm* — Nixon & Vanderhye P.C.

(57) ABSTRACT

A tubular member is provided between an inner wall of a hole portion in a fixed member and a shaft. A predetermined gap is provided between an inner wall of the tubular member on a radial inside thereof and the shaft, so that the shaft is rotatable around an axis with respect to the tubular member. On the other hand, the inner wall of the hole portion and the tubular member are fixed to each other. When a load is applied to a predetermined position of a brake pedal, where a driver can apply a pedaling force in a stuck state in which the tubular member and the shaft are stuck together, a torque that releases fixation between the inner wall of the hole portion and the tubular member is greater than 0, and is smaller than a damaging torque that damages at least a part of the brake pedal device.

6 Claims, 24 Drawing Sheets

PRESS-FIT MARGIN OF HOLE AND TUBULAR MEMBER

PEDAL STROKE

PRESS-FIT MARGIN OF ANNULAR GROOVE AND RESTRICTING MEMBER

PEDAL STROKE

BRAKE PEDAL DEVICE

CROSS REFERENCE TO RELATED APPLICATIONS

The present application is a continuation application of International Patent Application No. PCT/JP2023/012235 filed on Mar. 27, 2023, which designated the U.S. and claims the benefit of priority from Japanese Patent Application No. 2022-075567 filed on Apr. 29, 2022. The entire disclosures of all of the above applications are incorporated herein by reference.

TECHNICAL FIELD

The present disclosure relates to a brake pedal device mounted on a vehicle.

BACKGROUND

Brake pedal devices mounted on vehicles are conventionally known. In such brake pedal device, a bush, a boss, and a brake pedal are rotatably provided on an axis of a collar with respect to a bracket and the collar. The bush has a tubular part that is press-fitted and fixed inside the boss. When a driver depresses the brake pedal and the boss rotates, an annular protrusion of the bush slides while contacting an outer peripheral surface of the collar, and a flange of the bush slides while contacting the bracket. When an environmental temperature changes, a frictional force changes between the flange of the bush and the bracket, thereby causing a change in a feeling of a pedaling force.

SUMMARY

According to one aspect of the present disclosure, a brake pedal device to be mounted on a vehicle includes a fixed member, a shaft, a brake pedal, and a tubular member. The fixed member is directly or indirectly fixed to a vehicle body. The shaft is supported by an inside of a hole portion provided in the fixed member, and is provided to be rotatable about a predetermined axis with respect to the fixed member. The brake pedal is fixed to the shaft and operated in a predetermined angular range around the axis of the shaft when being depressed by a driver. The tubular member is provided at a position between an inner wall of the hole portion and the shaft. A predetermined gap is provided between the inner wall of the tubular member on a radial inside and the shaft, to allow the shaft to rotate around the axis with respect to the tubular member. The tubular member and the inner wall of the hole portion are provided in the fixed member are fixed to each other. When a load is applied to a predetermined position of the brake pedal where the driver is capable of applying a pedaling force in a stuck state where the tubular member and the shaft are stuck together, a torque that releases fixation between the inner wall of the hole portion and the tubular member in the stuck state is greater than 0, and is smaller than a damaging torque of the load applied to the predetermined position of the brake pedal in the stuck state, which damages at least one of the fixed member, the shaft, the brake pedal, or at least one of connection points therebetween.

According to another aspect, a brake pedal device to be mounted on a vehicle includes a fixed member, a shaft, a brake pedal, and a restricting member. The fixed member is directly or indirectly fixed to a vehicle body. The shaft is supported by an inside of a hole portion provided in the fixed member, and is provided to be rotatable about a predetermined axis with respect to the fixed member. The brake pedal is fixed to the shaft to surround a radial outside region of the shaft, and is configured to move in a predetermined angular range around the axis of the shaft when being depressed by a driver. The restricting member is provided to surround a radial outside region of the shaft at a position between a surface of the brake pedal facing in an axial direction and the fixed member, and to restrict a movable range of the shaft and the brake pedal in the axial direction. A predetermined gap is provided at a position between the surface of the brake pedal facing in the axial direction and the restricting member, to cause the shaft and the brake pedal to rotate around the axis with respect to the restricting member. The fixed member and the restricting member are fixed to each other. Furthermore, a torque that releases fixation between the inner wall of the hole portion and the tubular member when a load is applied to a predetermined position of the brake pedal in which the driver is capable of applying a pedaling force in a stuck state where the restricting member and the brake pedal are stuck together, is greater than 0, and is smaller than a damaging torque that damages at least one of the fixed member, the shaft, the brake pedal, or at least one of connection points therebetween when the load is applied to the predetermined position of the brake pedal in the stuck state.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
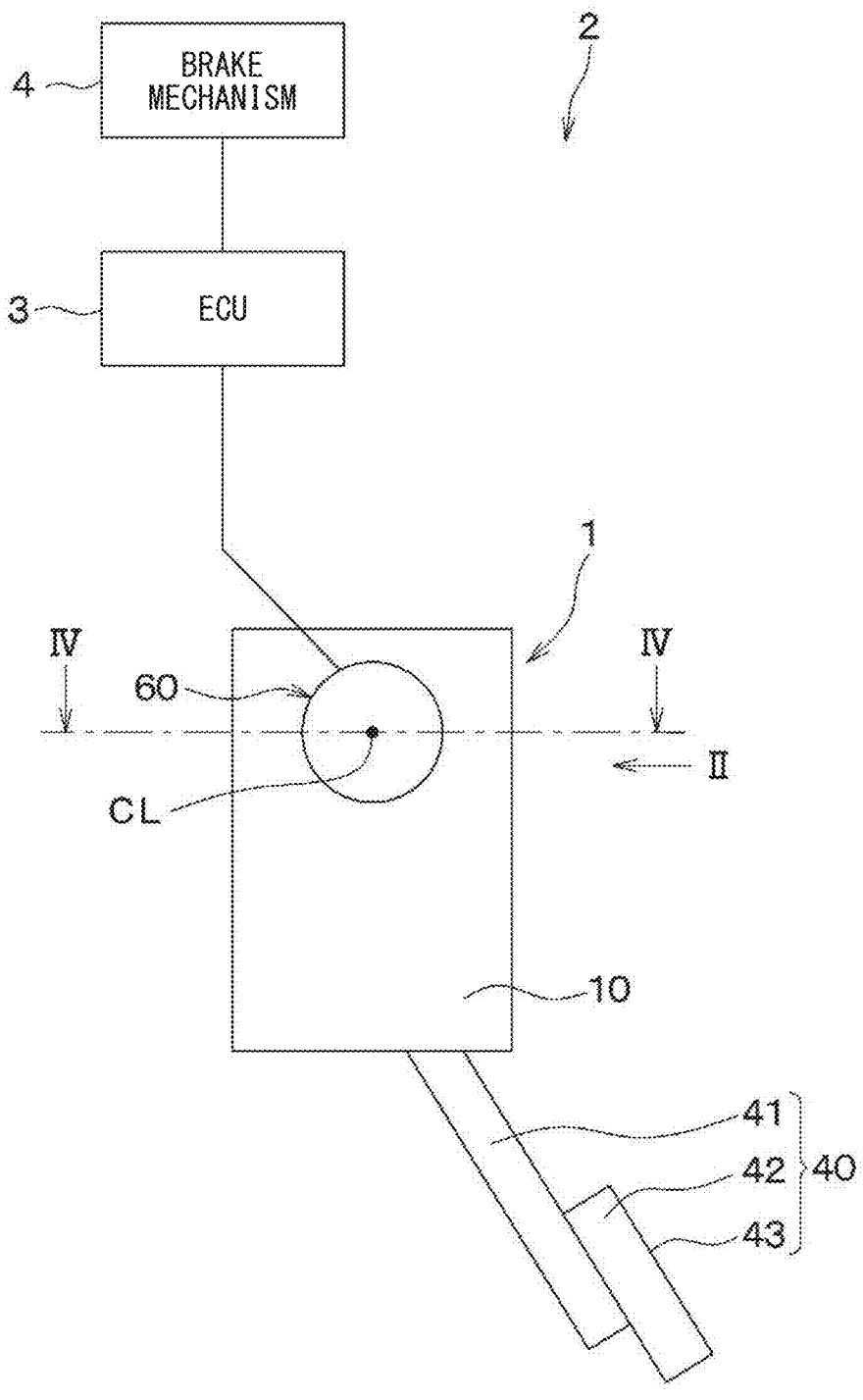
FIG. 1 is a schematic configuration diagram of a brake-by-wire system including a side view of a brake pedal device according to a first embodiment.
Figure 2:
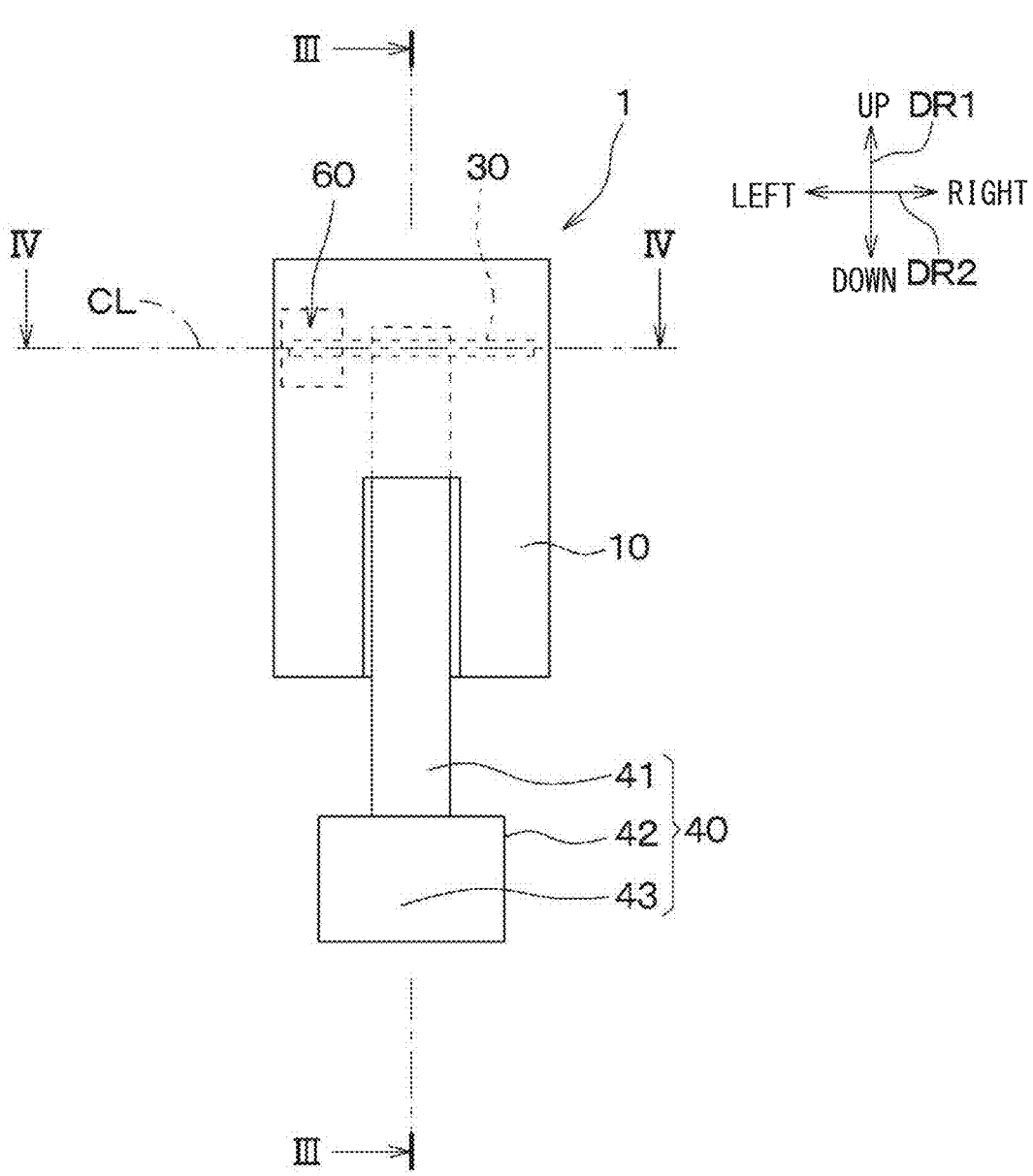
FIG. 2 is a plan view of the brake pedal device taken along an arrow II in FIG. 1.

Brake pedal devices mounted on vehicles are conventionally known. The brake pedal device includes a bracket fixed to a vehicle body, a collar fixed to the bracket, a tubular bush rotatably provided on an outer periphery of the collar, a tubular boss fixed on an outer periphery of the bush, and a brake pedal fixed to the boss. In such brake pedal device, the bush, the boss, and the brake pedal are rotatably provided on an axis of the collar with respect to the bracket and the collar. The bush has a tubular part that is press-fitted and fixed inside the boss, an annular protrusion provided on an inner peripheral surface of the tubular part, and a flange that extends radially outward from an axial end of the tubular part. The annular protrusion of the bush is in contact with an outer peripheral surface of the collar, and the flange is in contact with the bracket.

In the brake pedal device described above, when a driver depresses the brake pedal and the boss rotates, the annular protrusion of the bush slides while contacting the outer peripheral surface of the collar, and the flange of the bush slides while contacting the bracket. Therefore, when an environmental temperature changes, a frictional force between (i) the annular protrusion of the bush and (ii) the outer peripheral surface of the collar changes due to a difference in linear expansion coefficients between the bush and the collar. Further, when the environmental temperature changes, the frictional force between the flange of the bush and the bracket changes due to a difference in linear expansion coefficients of the bush, bracket and boss. As a result, a feeling of a pedaling force, exerted when the driver depresses the brake pedal, changes depending on the environmental temperature.

In order to solve such problems, it may be considered to provide, for example, a gap at a position between the annular protrusion of the bush and the collar, and another gap at a position between the flange of the bush and the bracket, so that the frictional force is not increased even in low-temperature environments. However, with such a configuration, the gaps therebetween become larger at a room temperature and at a high-temperature environment, thereby having a risk of foreign matter to enter into the gap. When the bush and boss become stuck to the bracket and collar with foreign matter entering the gap therebetween, there may be a concern that the driver will not be able to correctly depress the brake pedal, which may cause a problem in the braking of the vehicle.

It is an object of the present disclosure to provide a brake pedal device that is capable of improving driver's feeling of pedaling force and is capable of raising safety level of vehicle braking.

According to one aspect of the present disclosure, a brake pedal device to be mounted on a vehicle includes a fixed member, a shaft, a brake pedal, and a tubular member. The fixed member is directly or indirectly fixed to a vehicle body. The shaft is supported by an inside of a hole portion provided in the fixed member, and is provided to be rotatable about a predetermined axis with respect to the fixed member. The brake pedal is fixed to the shaft and operated in a predetermined angular range around the axis of the shaft when being depressed by a driver. The tubular member is provided at a position between an inner wall of the hole portion and the shaft. A predetermined gap is provided between the inner wall of the tubular member on a radial inside and the shaft, to allow the shaft to rotate around the axis with respect to the tubular member. The tubular member and the inner wall of the hole portion are provided in the fixed member are fixed to each other. When a load is applied to a predetermined position of the brake pedal where the driver is capable of applying a pedaling force in a stuck state where the tubular member and the shaft are stuck together, a torque that releases fixation between the inner wall of the hole portion and the tubular member in the stuck state is greater than 0, and is smaller than a damaging torque of the load applied to the predetermined position of the brake pedal in the stuck state, which damages at least one of the fixed member, the shaft, the brake pedal, or at least one of connection points therebetween.

According to the above, since the predetermined gap is provided at a position between the inner wall of the tubular member on the radial inside of the tubular member and the shaft, the feeling of the pedaling force exerted when the driver depresses the brake pedal is maintained stably regardless of changes in an environmental temperature. Further, in such brake pedal device, when a load is applied to the predetermined position of the brake pedal in the stuck state where the tubular member and the shaft are stuck together, a release torque that releases the fixation between the inner wall of the hole portion in the fixed member and the tubular member is smaller than a damaging torque damaging at least a part of the brake pedal device. Therefore, even if the tubular member and the shaft become stuck due to foreign matter entering the gap between the tubular member and the shaft, when the driver depresses the brake pedal, the fixation between the inner wall of the hole portion in the fixed member and the tubular member is released before at least a part of the brake pedal device is damaged, thereby allowing the brake pedal to rotate. Thus, such a brake pedal device eliminates changes in the feeling of the pedaling force due to changes in the environmental temperature, and allows the brake pedal to be depressed and operated even when the tubular member and the shaft are unintentionally stuck together. As a result, the brake pedal device of the present disclosure is capable of improving the driver's feeling of the pedaling force and raising safety level of vehicle braking according to a brake pedal operation by the driver.

In the specification of the present disclosure, "damage" includes destruction, deformation, displacement, and the like, and refers to a malfunction of the damaged member or a change in the shape of the damaged member.

Furthermore, in the specification of the present disclosure, a torque that releases the fixation between the inner wall of the hole portion and the tubular member is greater than 0 means that such a torque is substantially greater than 0, and, more specifically, means that the torque is greater than a frictional force that occurs between the inner wall of the tubular member and the shaft when the tubular member and the shaft are in a state not being fixed to each other.

According to another aspect, a brake pedal device to be mounted on a vehicle includes a fixed member, a shaft, a brake pedal, and a restricting member. The fixed member is directly or indirectly fixed to a vehicle body. The shaft is supported by an inside of a hole portion provided in the fixed member, and is provided to be rotatable about a predetermined axis with respect to the fixed member. The brake pedal is fixed to the shaft to surround a radial outside region of the shaft, and is configured to move in a predetermined angular range around the axis of the shaft when being depressed by a driver. The restricting member is provided to surround a radial outside region of the shaft at a position between a surface of the brake pedal facing in an axial direction and the fixed member, and to restrict a movable range of the shaft and the brake pedal in the axial direction. A predetermined gap is provided at a position between the surface of the brake pedal facing in the axial direction and the restricting member, to cause the shaft and the brake pedal to rotate around the axis with respect to the restricting member. The fixed member and the restricting member are fixed to each other. Furthermore, a torque that releases fixation between the inner wall of the hole portion and the tubular member when a load is applied to a predetermined position of the brake pedal in which the driver is capable of applying a pedaling force in a stuck state where the restricting member and the brake pedal are stuck together, is greater than 0, and is smaller than a damaging torque that damages at least one of the fixed member, the shaft, the brake pedal, or at least one of connection points therebetween when the load is applied to the predetermined position of the brake pedal in the stuck state.

According to the above, because a predetermined gap is provided at a position between the surface of the brake pedal that faces the axis of the shaft and the restricting member, the feeling of the driver with respect to the pedaling force when the driver operates the brake pedal can be maintained as constant regardless of changes in the environmental temperature. Further, in such brake pedal device, when a load is applied to the predetermined position of the brake pedal in the stuck state where the restricting member and the brake pedal are stuck together, a torque releasing fixation between the fixed member and the restricting member is smaller than the damaging torque that damages at least a part of the brake pedal device. Therefore, even when the restricting member and the brake pedal become stuck due to foreign matter entering the gap between the restricting member and the brake pedal, before at least a part of the brake pedal device is damaged when the driver depresses the brake pedal, fixation between the fixed member and the restricting member is released, thereby allowing rotation of the brake pedal. Thus, the brake pedal device described above eliminates changes in the feeling of the pedaling force due to changes in the environmental temperature, and allows the pedaling operation of the brake pedal even when the restricting member and the brake pedal are unintentionally stuck together. As a result, the brake pedal device of the present disclosure is capable of improving the driver's feeling of the pedaling force and raising safety level of vehicle braking according to brake pedal operation by the driver.

Hereinafter, embodiments of the present disclosure will be described with reference to the drawings. In the following embodiments, the same or equivalent parts are designated by the same reference numerals as each other, and redundant explanations regarding the same reference numerals are omitted.

First Embodiment

The first embodiment will be described with reference to the drawings. A brake pedal device 1 according to the first embodiment will be described taking, as an example, a device that is mounted on a vehicle and used in a brake-by-wire system 2 for braking the vehicle. As shown in FIG. 1, the brake-by-wire system 2 is a system in which a brake mechanism 4 brakes the vehicle under drive control of an electronic control unit (hereinafter referred to as "ECU 3") mounted on the vehicle. The ECU is an abbreviation for electronic control unit. In particular, the brake pedal device 1 of the first embodiment is used in a complete brake-by-wire system 2. A complete brake-by-wire system 2 means that components of the brake mechanism 4 and the brake pedal are not mechanically connected, and the ECU 3 performs drive control of the brake mechanism 4 based on an output signal of a sensor device included in the brake pedal device 1 for braking the vehicle. The component of the brake mechanism 4 is, for example, a master cylinder.

First, a schematic configuration of the brake pedal device 1 and the brake-by-wire system 2 will be explained.

As shown in FIGS. 1 to 4, the brake pedal device 1 includes a housing 10 as a fixed member, a tubular member 20, a shaft 30, a brake pedal 40, a reaction force generating mechanism 50, a sensor device 60, and the like.

Figure 4:
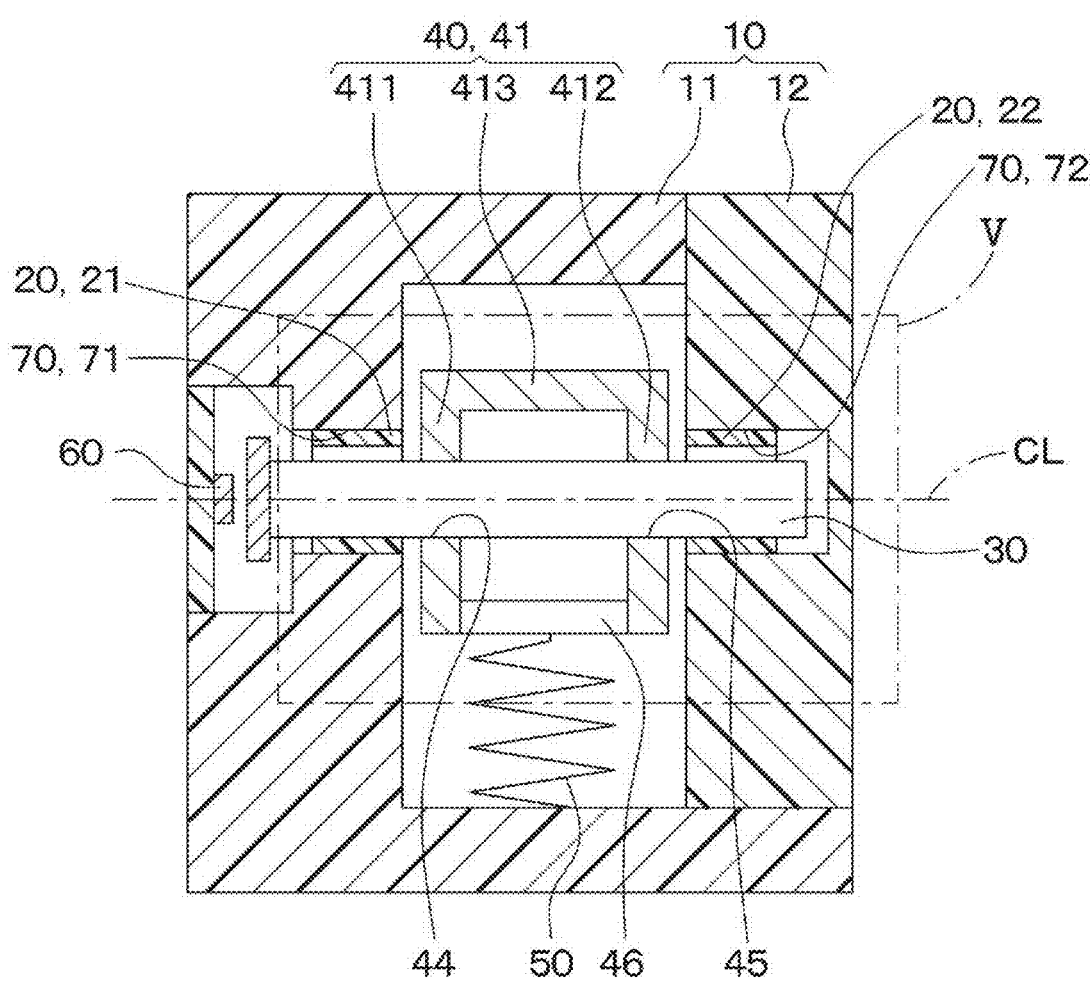
FIG. 4 is a cross-sectional view taken along a line IV-IV in FIGS. 1, 2, and 3A.

The housing 10 is directly fixed to a vehicle body using bolts (not shown) or the like, or is indirectly fixed to the vehicle body via a base member (not shown) or the like. Specifically, the housing 10 is fixed to a dash panel or floor inside a vehicle compartment. As shown in FIG. 4, the housing 10 includes a housing body 11 and a housing cover 12. The housing body 11 and the housing cover 12 are fixed to each other by, for example, screws, press fit, snap fit, or the like (not shown). A hole portion 70 is provided inside the housing 10 in which the tubular member 20 and the shaft 30 are provided. The hole portions 70 are provided in the housing body 11 and the housing cover 12, respectively. In the following description, the hole portion 70 provided in the housing body 11 may be referred to as a first hole portion 71, and the hole portion 70 provided in the housing cover 12 may be referred to as a second hole portion 72.

Figure 5:
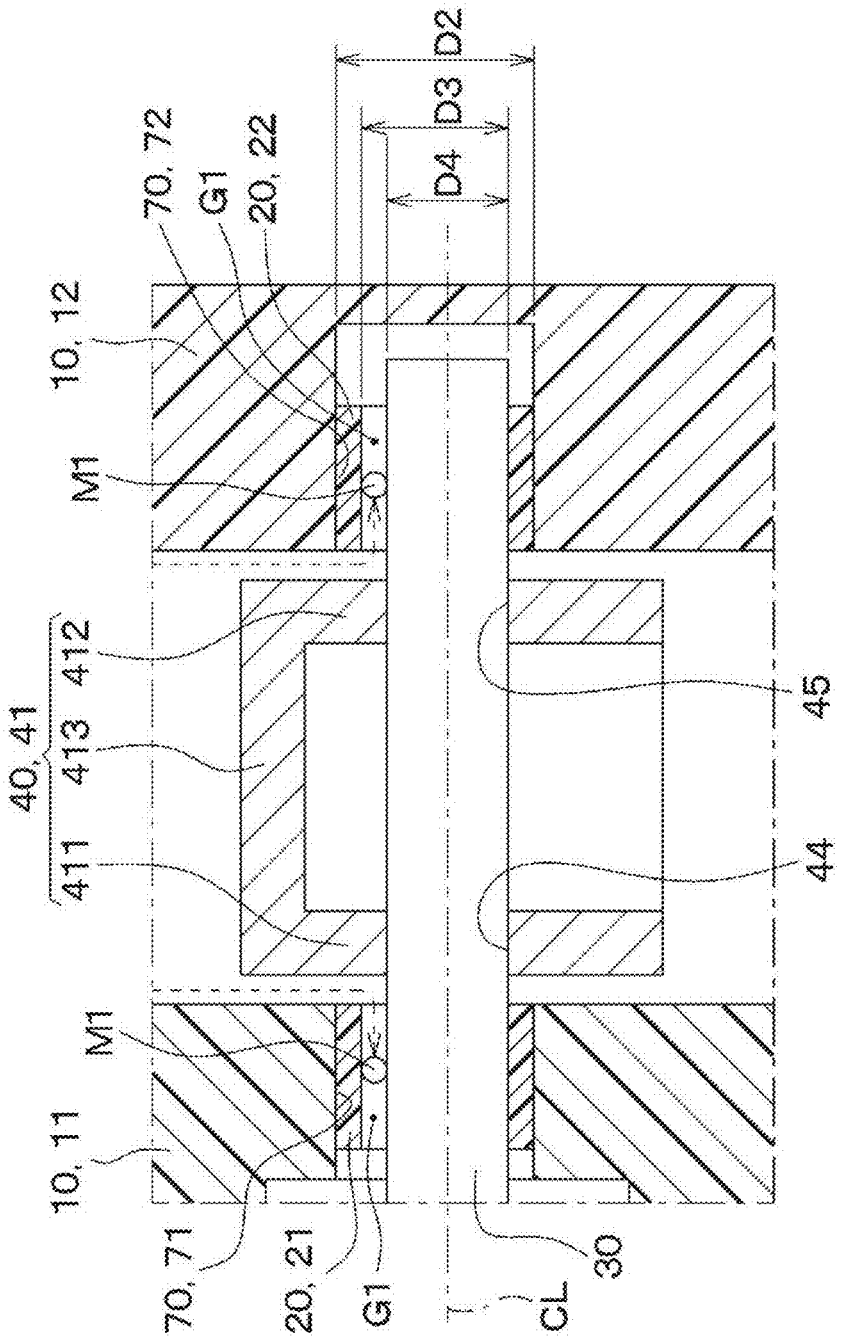
FIG. 5 is a cross-sectional view of a section V in FIG. 4, with a reaction force generation mechanism omitted therefrom.

As shown in FIGS. 4 and 5, the tubular member 20 is a sliding bearing, and is provided at a position between an inner wall of the hole portion 70 and the shaft 30. The tubular member 20 may also be called as a radial bearing, which supports a load acting in a direction perpendicular to an axis CL. The tubular member 20 may be made of metal, resin, ceramic, or the like, for example. In the following description, the tubular member 20 provided inside the first hole portion 71 will be referred to as a first tubular member 21, and the tubular member 20 provided inside the second hole portion 72 will be referred to as a second tubular member 22. Sometimes.

In the first embodiment, an outer diameter of the tubular member 20 as a component is slightly larger than an inner diameter D2 of the hole portion 70. Therefore, the inner wall of the hole portion 70 and an outer wall of the tubular member 20 on a radial outside thereof are fixed to each other by press-fitting. On the other hand, an inner diameter D3 of the tubular member 20 is larger than an outer diameter D4 of the shaft 30. Therefore, a predetermined gap G1 is provided at a position between an inner wall of the tubular member 20 on a radial inside thereof and the shaft 30, allowing the shaft 30 to rotate about its own axis with respect to the tubular member 20. In the following description, an outer wall of the tubular member 20 on a radial outside thereof may simply be referred to as an "outer wall of the tubular member 20," and an inner wall of the tubular member 20 on a radial inside thereof may simply be referred to as an "inner wall of the tubular member 20."

The shaft 30 is formed in a rod shape and is rotatably supported by the tubular member 20 inside the housing 10. Specifically, one end of the shaft 30 is rotatably supported by the first tubular member 21, and the other end of the shaft 30 is rotatably supported by the second tubular member 22. Therefore, the shaft 30 is supported inside the hole portion 70 via the tubular member 20, and the shaft 30 is rotatable in a circumferential direction of a circle centered on its own axis CL (hereinafter referred to as "around the axis") with respect to the housing 10 in a predetermined angular range.

The shaft 30 rotates while contacting a part of the inner wall of the tubular member 20 due to a driver's pedaling force applied to the brake pedal 40 or gravity. In FIGS. 4 and 5, for convenience of explanation, the shaft 30 is illustrated in a state in which (i) the shaft 30 in the drawing is in contact with a lower part of the inner wall of the tubular member 20, and (ii) an upper part of the inner wall of the tubular member 20 and the shaft 30 are separated by a gap G1 provided therebetween.

As shown in FIGS. 1, 2, 3A, and 3B, the brake pedal 40 includes a pedal arm 41 and a pedal pad 42. The pedal arm 41 is fixed to the shaft 30 at one end in a longitudinal direction (i.e., a part disposed inside the housing 10), and is provided with a pedal pad 42 at other end in the longitudinal direction (i.e., a part disposed outside the housing 10). As shown in FIGS. 3A, 3B, 4, and 5, the pedal arm 41 is a one-body component which is formed to have a first side plate 411, a second side plate 412, and a top plate 413 in one body. The first side plate 411 is a portion provided on a first tubular member 21 side. The second side plate 412 is a portion provided on a second tubular member 22 side. The top plate 413 is a portion that connects the first side plate 411 and the second side plate 412. The first side plate 411 and the second side plate 412 are provided with insertion hole portions 44, 45, respectively, through which the shaft 30 passes. Edges of the insertion hole portions 44 and 45 and the shaft 30 are fixed to each other by, for example, welding. Therefore, the first side plate 411 and the second side plate 412 of the pedal arm 41 surround a radial outside region of the shaft 30 and are fixed to the shaft 30.

The pedal pad 42 is provided at other longitudinal end of the pedal arm 41, that is, at a portion located outside the housing 10. A tread 43 of the pedal pad 42 is a part that is depressed by the driver's foot. When the driver depresses the tread 43 of the pedal pad 42, the brake pedal 40 rotates in a forward and backward directions in the predetermined angular range around the axis of the shaft 30. The tread 43 of the pedal pad 42 is an example of a predetermined position on the brake pedal 40 to which the driver can apply a pedaling force.

Figure 3A:
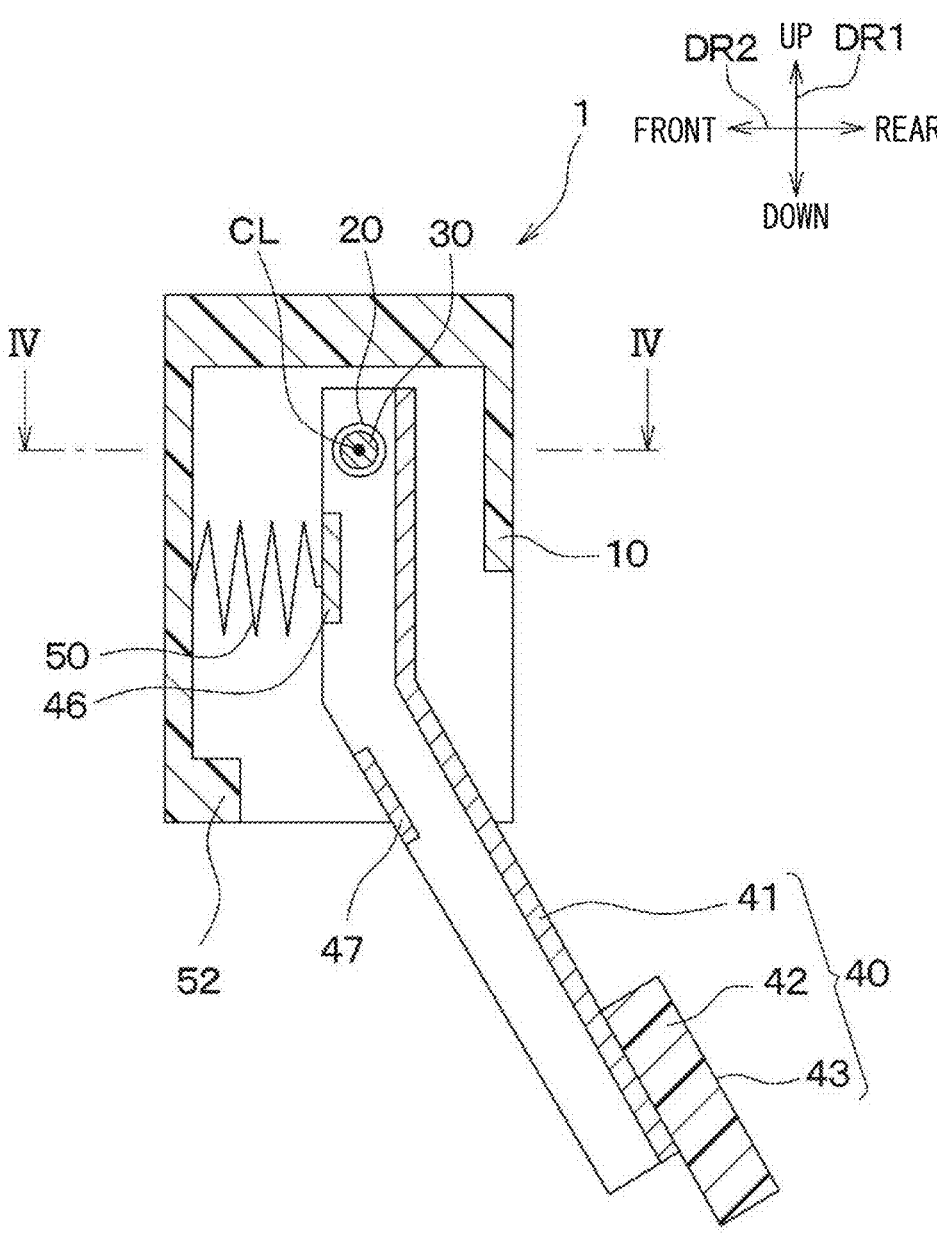
FIG. 3A is a cross-sectional view taken along a line III-III in FIG. 2.
Figure 3B:
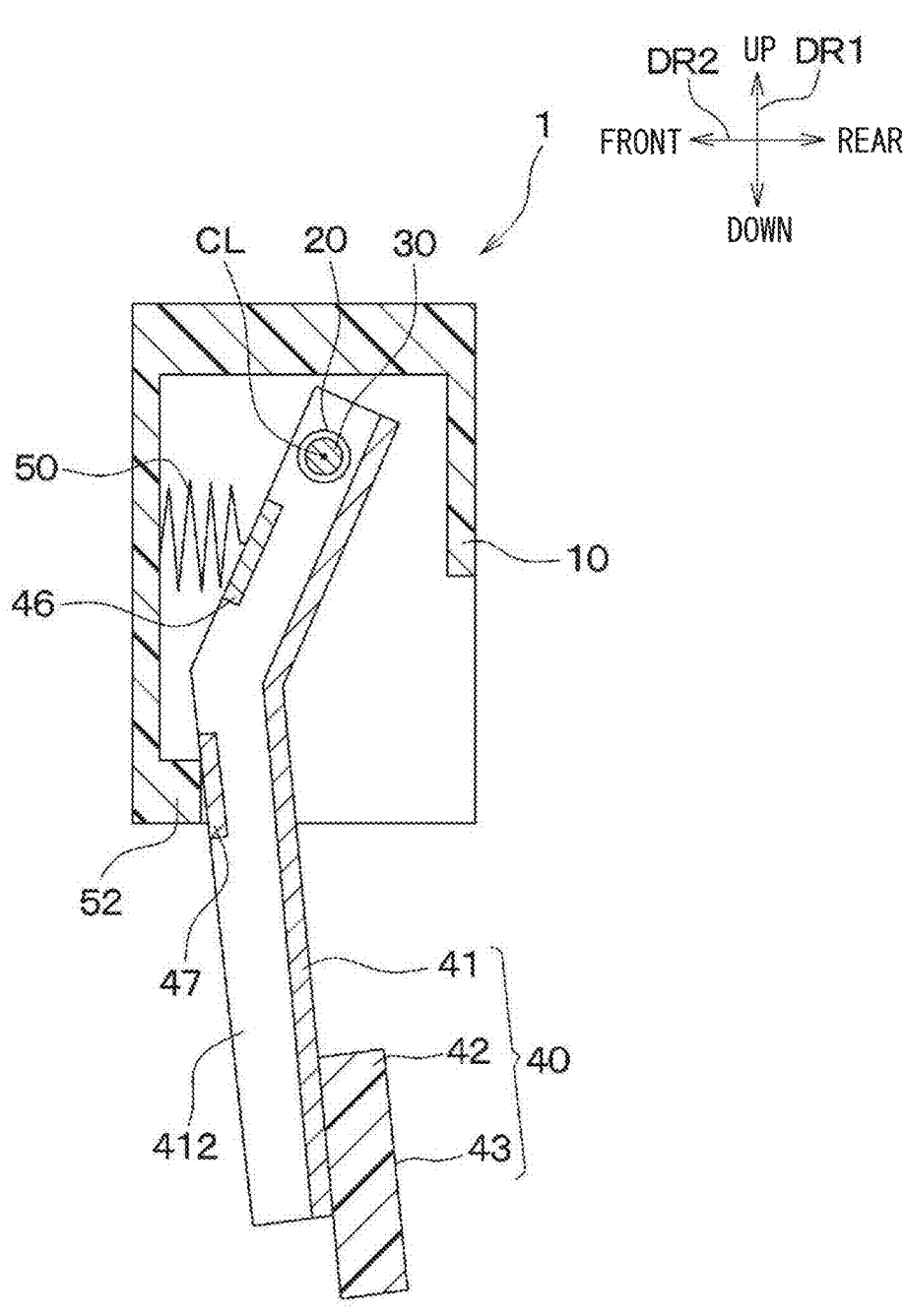
FIG. 3B is a cross-sectional view showing a state in which the brake pedal is depressed to its maximum stroke in the brake pedal device according to the first embodiment.

FIG. 3A shows an initial position in an operation range of the brake pedal 40 where no pedaling force of the driver is applied to the brake pedal 40. On the other hand, FIG. 3B shows a state in which the driver's pedaling force is applied to the brake pedal 40 rotating the brake pedal 40 to a maximum stroke position of a depression side. A restriction member 52 for restricting the maximum stroke position of the brake pedal 40 on the depression side is provided in the housing 10 or the like. The maximum stroke position of the brake pedal 40 is restricted by the contact between the restriction member 52 and a portion 48 of the pedal arm 41. The structure, in which the maximum stroke position on the depression side of the brake pedal 40 is restricted, is not limited to the restriction member 52 shown in FIG. 3B or the like. The positions and shapes of the restriction member 52 and the protrusions that restrict the maximum stroke position may vary, and material used to form the restriction member 52 may be, for example, resin, metal, rubber, or a combination thereof.

In specification of the present disclosure, the brake pedal device 1 includes the restriction member 52 that restricts the maximum stroke position of the brake pedal 40, and a position where the restriction member 52 and the brake pedal 40 come into contact is defined as the maximum stroke position.

The reaction force generating mechanism 50 includes, for example, a spring, an actuator, and the like. The reaction force generating mechanism 50 is a mechanism that generates a reaction force against the driver's pedaling force applied to the brake pedal 40. Even when eliminating a mechanical connection between the brake pedal 40 and the conventional master cylinder, by including the reaction force generating mechanism 50, the brake pedal device 1 can obtain a reaction force similar to the one obtainable from the connection to the master cylinder, that is, similar to the one obtainable from a hydraulic reaction force providing system. In FIGS. 3A and 3B, the reaction force generating mechanism 50 is schematically shown as a spring that applies a reaction force to a reinforcing portion 46, which has one end fixed to the housing 10 and the other end provided to the pedal arm 41. However, the reaction force generating mechanism 50 is not limited to the above, and various configurations may be adoptable. Here, the reaction force generating mechanism 50 and the reinforcing portion 46 are omitted from FIG. 5. The same applies to drawings showing portions corresponding to FIG. 5 in the drawings to be referred to in the embodiments described later.

The sensor device 60 detects a position (specifically, a rotation angle) of a detection object with respect to the housing 10, the shaft 30 or the brake pedal 40 being considered as the detection object. The sensor device 60 may be of various types. For example, as the sensor device 60, it is possible to adopt (i) a non-contact type sensor such as an inductive sensor, a magnetic sensor, an optical sensor or the like, or (ii) a contact type sensor such as a load sensor, a rotary encoder or the like. The electric signal output from the sensor device 60 is transmitted to the ECU 3.

As shown in FIG. 1, the ECU 3 includes a processor that performs control processing and arithmetic processing, a microcomputer including a storage such as ROM and RAM that stores programs, data, and the like, and peripheral circuits. The storage includes non-transitory, tangible storage media. The ECU 3 performs various control processes and calculation processes based on programs stored in the storage, and controls an operation of each device connected to an output port. Specifically, the ECU 3 detects an accurate amount of pedal operation, that is, an amount of operation of the brake pedal 40, based on an electric signal transmitted from the sensor device 60, or the like, and controls the drive of the brake mechanism 4. The number of ECUs 3 is not limited to one, and the driving of the brake mechanism 4 may be controlled by a plurality of ECUs 3.

Various mechanisms may be employable as the brake mechanism 4. For example, the brake mechanism 4 may be an electric brake that brakes each wheel by (a) driving an electric motor in response to an instruction from the ECU 3 and (b) pressing a brake pad against a disc brake rotor. Alternatively, for example, the brake mechanism 4 may be configured to increase a hydraulic pressure of brake fluid by operating a master cylinder or a hydraulic pump, drive a wheel cylinder disposed on each wheel, and operate the brake pad. Further, the brake mechanism 4 is also capable of performing normal control, ABS control, VSC control, and the like in response to control signals from the ECU 3. ABS stands for Anti-lock Braking System, and VSC stands for Vehicle Stability Control.

Next, the tubular member 20 included in the brake pedal device 1 of the first embodiment will be described in detail.

As shown in FIGS. 4 and 5, the tubular member 20 is provided at a position between the inner wall of a hole portion 70 provided in the housing 10 and the shaft 30. The outer wall of the tubular member 20 and the inner wall of the hole portion 70 are fixed to each other by press-fitting. On the other hand, a predetermined gap G1 is provided at a position between the inner wall of the tubular member 20 and the shaft 30. The size of the gap G1 between the inner wall of the tubular member 20 and the shaft 30 is such that, even when the tubular member 20 and the shaft 30 expand and contract due to changes in environmental temperature, the gap G1 does not disappear and the shaft 30 is rotatable around the axis thereof inside the tubular member 20. Therefore, in such brake pedal device 1, the feeling of the pedaling force when the driver depresses the brake pedal 40 does not change and remains constant regardless of changes in the environmental temperature.

However, by providing the predetermined gap G1 between the inner wall of the tubular member 20 on a radial inside thereof and the shaft 30, as shown by a broken line arrow in FIG. 5, there is a risk of intrusion of foreign matter M1 entering the gap G1. The foreign matter M1 is, for example, sand, dirt, or the like. When the foreign matter M1 caught in the gap G1 and causing stuck of the tubular member 20 and the shaft 30 prevents the shaft 30 from rotating, the driver will not be able to depress the brake pedal 40, which may cause problems with braking the vehicle. The situation where the tubular member 20 and shaft 30 become stuck is not limited to the above-mentioned situation of catching the foreign matter M1 in the gap, but, for example, it may also be possible that the gap G1 between the inner wall of the tubular member 20 and the shaft 30 is unintentionally made small, causing the tubular member 20 and the shaft 30 to adhere to each other due to temperature changes. As the temperature change described above, for example, contraction of the tubular member 20 at low temperatures can be considered. Alternatively, it may also be possible that the tubular member 20 and the shaft 30 are stuck together due to rusting or the like of the shaft 30.

In contrast, in the first embodiment, even when the tubular member 20 and the shaft 30 are stuck together, when the driver depresses the brake pedal 40, it is configured that fixation between (a) the inner wall of the hole portion 70 in the housing 10 and (b) the tubular member 20 is released before at least a part of the brake pedal device 1 is damaged. Hereinafter, the configuration described above will be referred to as a "first configuration."

In the specification of the present disclosure, when at least a part of the brake pedal device 1 is damaged, it means that one or more of the housing 10, the shaft 30, the brake pedal 40, and connection positions therebetween are damaged. Further, in the specification of the present disclosure, damage includes destruction, deformation, displacement, or the like, and refers to a problem in the function of a damaged member or a change in the shape of a damaged member.

Further, in the first embodiment, it may also be possible to have a configuration in which the fixation between the inner wall of the hole portion 70 in the housing 10 and the tubular member 20 is released when a typical driver depresses the brake pedal 40 with a normal force in a stuck state where the tubular member 20 and the shaft 30 are stuck or fixed to each other. Hereinafter, such a configuration will be referred to as a "second configuration." In the configuration of the brake pedal device 1 of the first embodiment, a torque when a typical driver depresses the brake pedal 40 with a normal force corresponds to a torque that causes the brake pedal 40 to reach the maximum stroke position on the depression side.

In the following explanation, the torque that releases the fixation between the inner wall of the hole portion 70 and the tubular member 20 when a load is applied to the tread 43 of the pedal pad 42 in a stuck state that the tubular member 20 and the shaft 30 are stuck together is designated as an "unfixing torque." In the first embodiment, the unfixing torque is set as follows in the above-described first configuration and the second configuration, respectively.

That is, when the above-mentioned first configuration is adopted, the unfixing torque is set to be greater than 0, and to be smaller than a torque at which at least a part of the brake pedal device 1 is damaged when a load is applied to the tread 43 of the pedal pad 42 in a stuck state that the tubular member 20 and the shaft 30 fixed to each other. In the specification of the present disclosure, the unfixing torque being greater than 0 means that it is substantially greater than 0, and more specifically, means that the unfixing torque is greater than a frictional force generated between the inner wall of the tubular member 20 and the shaft 30 in a state that the tubular member 20 and the shaft 30 are not stuck. Hereinafter, a state in which the tubular member 20 and the shaft 30 are not stuck will be referred to as a "non-stuck state between the tubular member 20 and the shaft 30."

Figure 6:
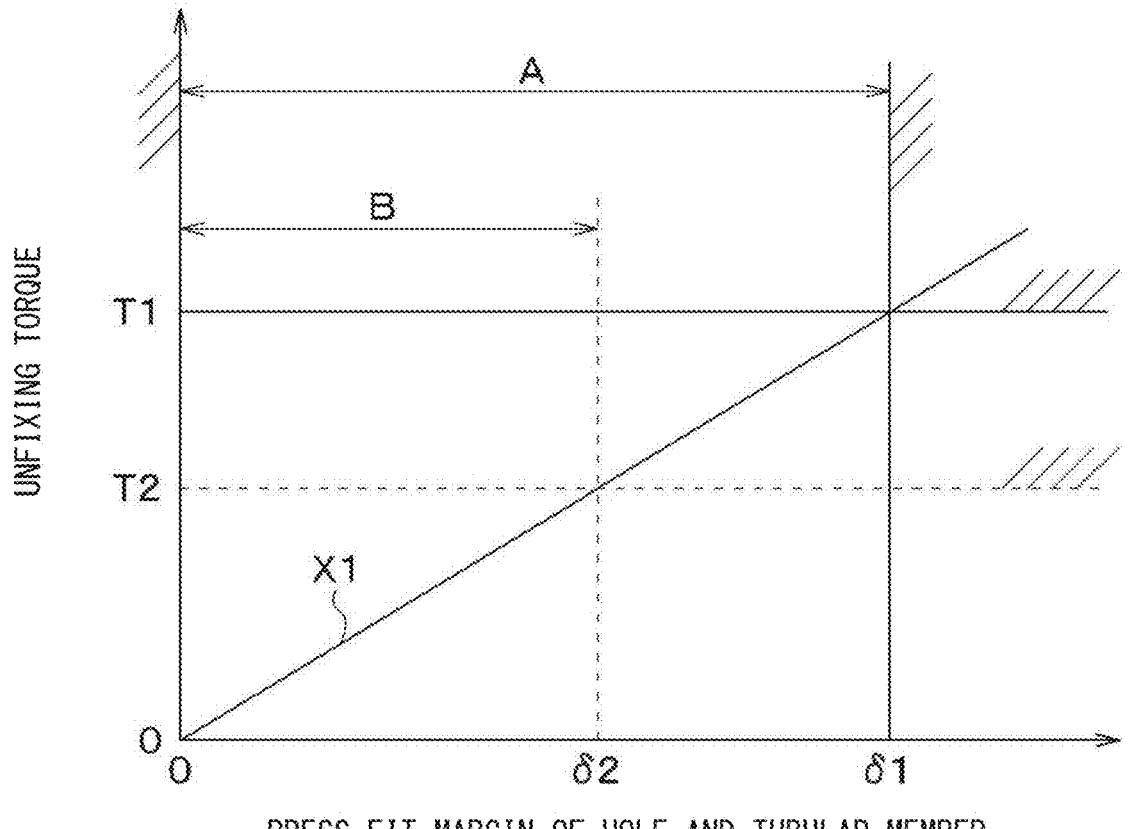
FIG. 6 is a graph showing a relationship between (i) a press-fit margin between a hole portion of a housing and a tubular member and (ii) a fixation release torque (unfixing torque) in a brake pedal device according to the first embodiment.

Here, FIG. 6 shows a relationship between a press-fit margin and the unfixing torque, using, as a horizontal axis, the press-fit margin between the inner wall of the hole portion 70 in the housing 10 and the outer wall of the tubular member 20 (hereinafter simply referred to as a "press-fit margin"), and, as a vertical axis, the unfixing torque. As shown by a solid line X1 in FIG. 6, the greater the press-fit margin is, the greater the unfixing torque becomes.

When the unfixing torque is greater than a value T1, when a load causing such a torque is applied to the tread 43 of the pedal pad 42 in a state in which the tubular member 20 and the shaft 30 are stuck, at least a part of the brake pedal device 1 will be damaged. The torque T1 is determinable through experiments or the like. In FIG. 6, the press-fit margin corresponding to the unfixing torque T1 is a dimension δ1. Therefore, when setting the unfixing torque in a range greater than 0 and smaller than the torque that would damage at least a part of the brake pedal device 1, the press-fit margin is set in a range greater than 0 and smaller than δ1. In FIG. 6, the range of press-fit margin in such case is indicated by a double-headed arrow A. In such manner, by setting the range of the press-fit margin to the range indicated by the double-headed arrow A in FIG. 6, the above-mentioned first configuration can be realized.

On the other hand, when the brake pedal device 1 adopts the second configuration described above, the unfixing torque is set to be greater than 0 and smaller than a torque of the pedaling force at the maximum stroke position in a normal time. In the description of the first embodiment, a "torque of the pedaling force at the maximum stroke position in a normal time" refers to a torque at which the brake pedal 40 reaches the maximum stroke position on the depression side when a load is applied to the tread 43 in a state where stuck or the like between the tubular member 20 and the shaft 30 is not generated.

Figure 7:
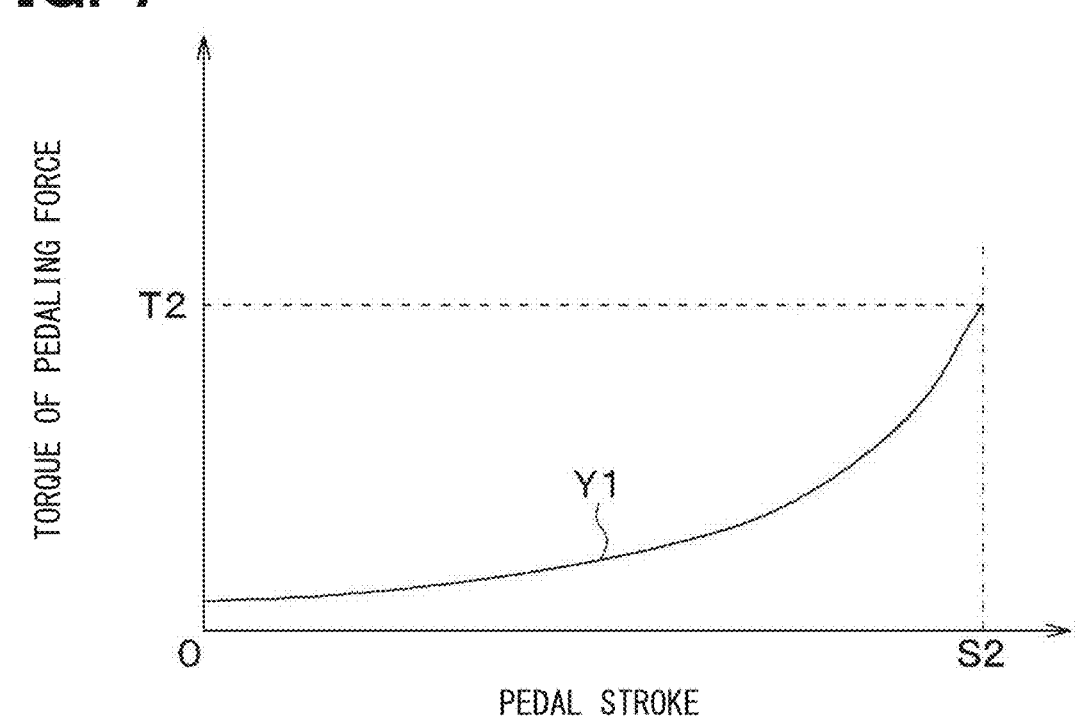
FIG. 7 is a graph showing a relationship between a pedal stroke and a pedaling force torque in the brake pedal device according to the first embodiment.

Here, FIG. 7 shows a relationship between the pedal stroke and the torque of a pedaling force when the driver applies a load to the tread 43 of the pedal pad 42 in a non-stuck state where the tubular member 20 and the shaft 30 are not stuck. The torque of the pedaling force is a torque that is applied to the pedal pad 42 when the driver depresses the brake pedal 40. More specifically, the torque is a product of the reaction force generated by the reaction force generating mechanism 50 and a distance from the axis CL of the shaft 30 to the tread 43 of the pedal pad 42.

As shown by a solid line Y1 in FIG. 7, as the pedal stroke becomes greater, the reaction force generated by the reaction force generating mechanism 50 becomes greater, and thereby the torque of the pedaling force becomes greater. When the pedal stroke is S2, the brake pedal 40 is at its maximum stroke position. In the graph of FIG. 7, the torque of the pedaling force at the maximum stroke position in a normal time takes a value T2.

As shown in FIG. 6 again, the press-fit margin corresponding to the unfixing torque T2 is a dimension δ2. Therefore, when setting the unfixing torque in a range greater than 0 and smaller than the torque of the pedaling force at the maximum stroke position in a normal time, the press-fit margin is set in a range greater than 0 and smaller than δ2. In FIG. 6, the range of press-fit margin in that case is indicated by double-headed arrows B. In such manner, by setting the range of the press-fit margin to a range shown by the double-headed arrow B in FIG. 6, the above-mentioned second configuration can be realized.

The brake pedal device 1 of the first embodiment described above has the following configuration and provides the following functions and effects.

(1) In the brake pedal device 1 of the first embodiment, the inner wall of the hole portion 70 formed in the housing 10 and the outer wall of the tubular member 20 are fixed to each other to each other. On the other hand, the predetermined gap G1 is provided at a position between the inner wall of the tubular member 20 and the shaft 30. In such manner, it is possible to maintain a constant feeling of the pedaling force when the driver depresses the brake pedal 40, regardless of changes in the environmental temperature. Further, in the first embodiment, when the above-mentioned first configuration is adopted, the unfixing torque is set to be smaller than the torque at which at least a part of the brake pedal device 1 is damaged when a load is applied to the tread 43 of the pedal pad 42 in a state where the tubular member 20 and the shaft 30 are stuck. According to the above, even when the tubular member 20 and the shaft 30 are unintentionally stuck together due to, for example, the foreign matter M1 being caught therebetween, when the driver depresses the brake pedal 40, stuck state between the inner wall of the hole portion 70 in the housing 10 and the tubular member 20 is released, and the brake pedal 40 rotates. In such a situation, the fixation between the inner wall of the hole portion 70 in the housing 10 and the tubular member 20 is released and the brake pedal 40 rotates before at least a part of the brake pedal device 1 is damaged. Therefore, the brake pedal device 1 of the present disclosure eliminates changes in the feeling of the pedaling force otherwise caused by changes in environmental temperature, and makes it possible to depress and operate the brake pedal 40 even when the tubular member 20 and the shaft 30 become unintentionally stuck together. Therefore, the brake pedal device 1 of the present disclosure is capable of improving the driver's feeling of the pedaling force and is also capable of raising safety level of vehicle braking by the driver's operation of the brake pedal 40.

(2) When the brake pedal device 1 of the first embodiment adopts the second configuration described above, the unfixing torque is set to be greater than 0 and smaller than the torque of the pedaling force at the maximum stroke position in a normal time. In a case of a brake pedal device 1 that does not have an elastic member as described in the second embodiment described later, the torque of the pedaling force at the maximum stroke position in a normal time is generally set as a torque of a pedaling force that is applicable to the brake pedal 40 by a typical driver with a normal force. Therefore, in the first embodiment, when the second configuration is adopted, the unfixing torque is set to be greater than 0 and smaller than the torque of the pedaling force at the maximum stroke position in a normal time. In such manner, even if the tubular member 20 and the shaft 30 are stuck together, when a typical driver depresses the brake pedal 40 with a normal force, the fixation (i.e., stuck state) between the inner wall of the hole portion 70 in the housing 10 and the tubular member 20 is released, and thereby the brake pedal 40 rotates. Therefore, in such a brake pedal device 1, even when the tubular member 20 and the shaft 30 are unintentionally stuck together, a typical driver can depress and operate the brake pedal 40 with a normal force. For example, a typical driver refers to a person who can drive a vehicle, and more specifically refers to a person who can brake the vehicle by operating the brake pedal 40 with his/her foot.

(3) In the brake pedal device 1 of the first embodiment, the inner wall of the hole portion 70 provided in the housing 10 and the tubular member 20 are fixed to each other by press-fitting. According to the above, by setting the press-fit margin between the inner wall of the hole portion 70 in the housing 10 and the outer wall of the tubular member 20, it is possible to realize a function in which (a) the hole portion 70 in the housing 10 and the tubular member 20 are in a fixed state in a normal time, and (b) such a fixation is releasable by applying a predetermined torque. Therefore, the inner wall of the hole portion 70 in the housing 10 and the tubular member 20 are easily fixed to each other by press-fitting, thereby reducing the assembly costs of manufacturing.

Second Embodiment

The following describes the second embodiment of the present disclosure. The second embodiment differs from the first embodiment in that part of the configuration of the brake pedal device 1 is changed, and the rest is the same as the first embodiment. Therefore, the following description focuses on the differences from the first embodiment.

Figure 8A:
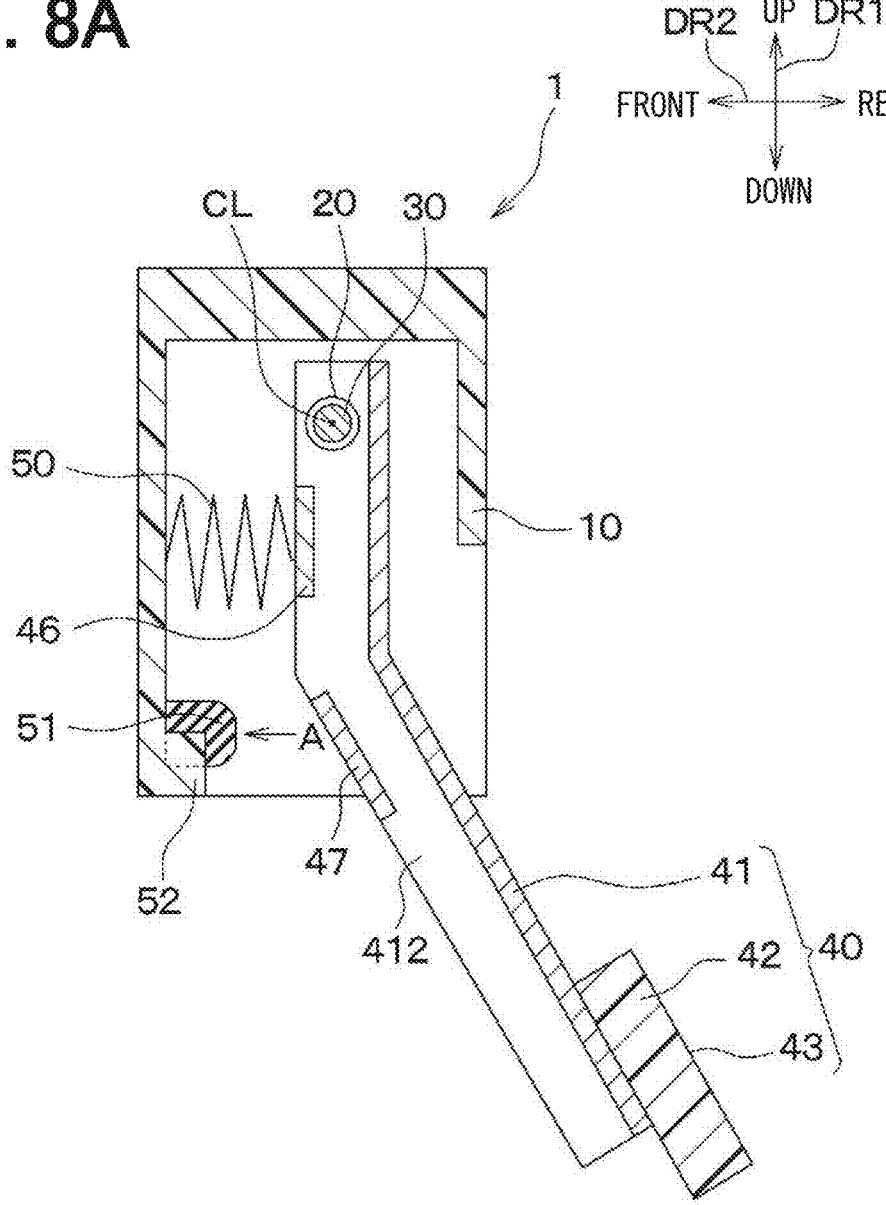
FIG. 8A is a cross-sectional view showing a brake pedal in an initial position of a brake pedal device according to a second embodiment.
Figure 8B:
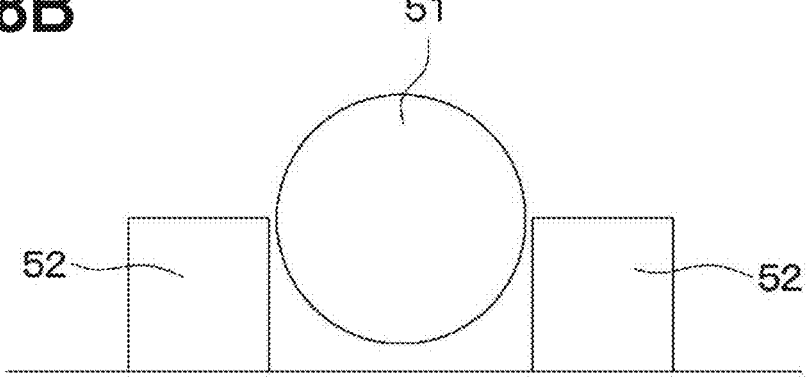
FIG. 8B is a view taken along an arrow A in FIG. 8A.

As shown in FIGS. 8A and 8B, a brake pedal device 1 of the second embodiment has an elastic member 51 provided at a position where it can come into contact with a brake pedal 40 when the driver depresses the brake pedal 40. The elastic member 51 is set up to operate, in an entire operation range of the brake pedal 40, from a position midway between (i) the initial position where the driver's pedaling force is not applied to the brake pedal 40 and (ii) the maximum stroke position on the depression side, to the maximum stroke position on the depression side. The elastic member 51 is made of rubber, for example, and is fixed to a housing 10. An arrangement relationship, shape, and the like between (i) a restriction member 52 that restricts the maximum stroke position of the brake pedal 40 and (ii) the elastic member 51 is not limited to the one shown in the drawings, and can arbitrarily be set.

As shown in FIG. 8A, when the brake pedal 40 is in the initial position, a predetermined space is provided at a position between a pedal arm 41 and the elastic member 51. The pedal arm 41 has a pressing portion 47 at a position corresponding to the elastic member 51. The pressing portion 47 may be formed integrally with a first side plate 411 and a second side plate 412 of the pedal arm 41, or may be formed as a separate member. Further, a reinforcing portion 46 provided on the pedal arm 41 at a position corresponding to the reaction force generating mechanism 50 and the pressing portion 47 may be integrally formed. In the following description, the pedal arm 41 will be described as having the pressing portion 47 as a part thereof.

Figure 9:
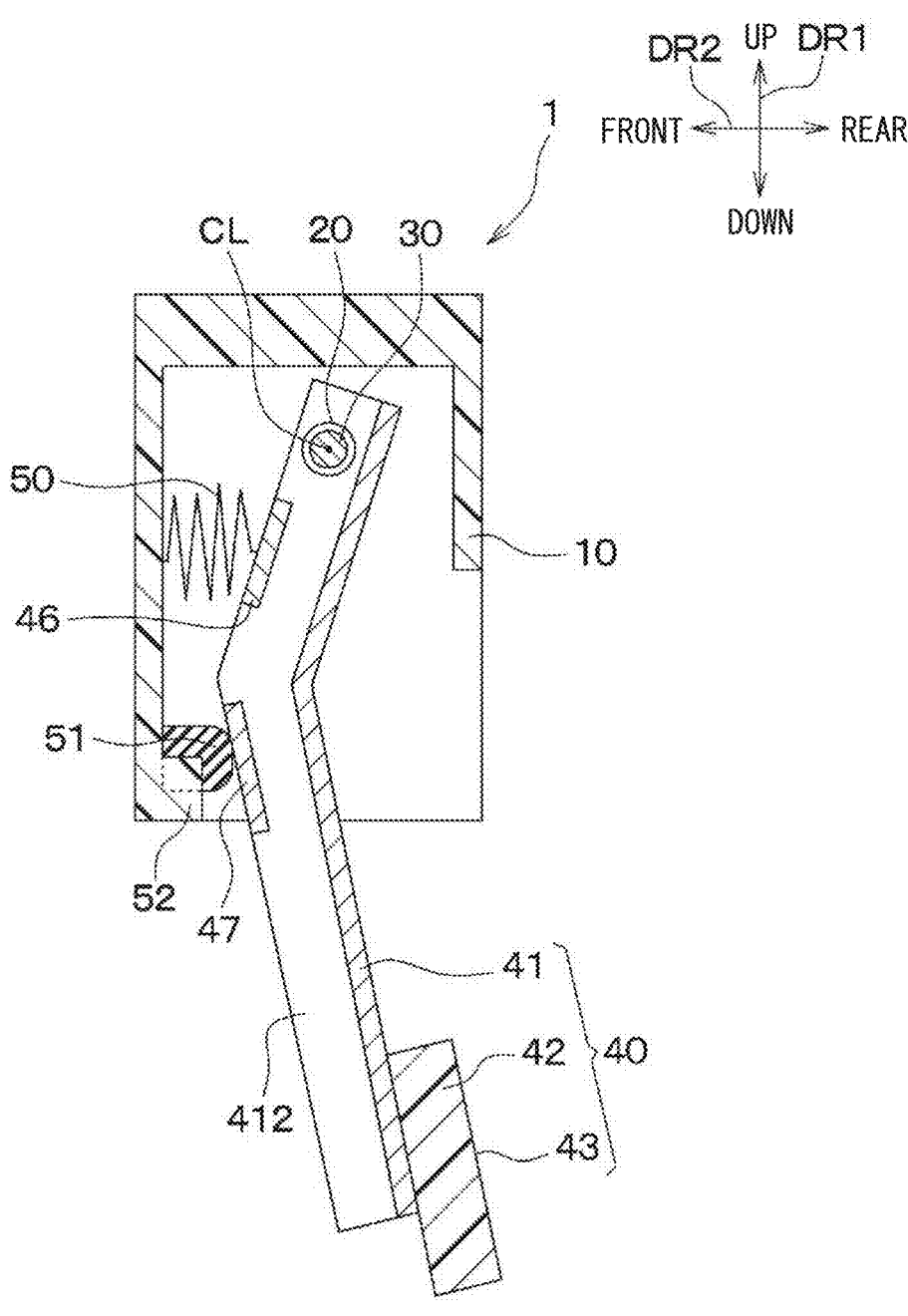
FIG. 9 is a cross-sectional view showing a state in which a brake pedal and an elastic member are in contact with each other in the brake pedal device according to the second embodiment.

Next, as shown in FIG. 9, when the driver applies a pedaling force to the brake pedal 40 and the brake pedal 40 rotates toward the depression side, the pressing portion 47 and the elastic member 51 come into contact with each other in the latter half of a depressing stroke of the brake pedal 40.

By depressing the brake pedal 40 to a position where it contacts the elastic member 51, it is possible to sufficiently decelerate the vehicle.

Figure 10:
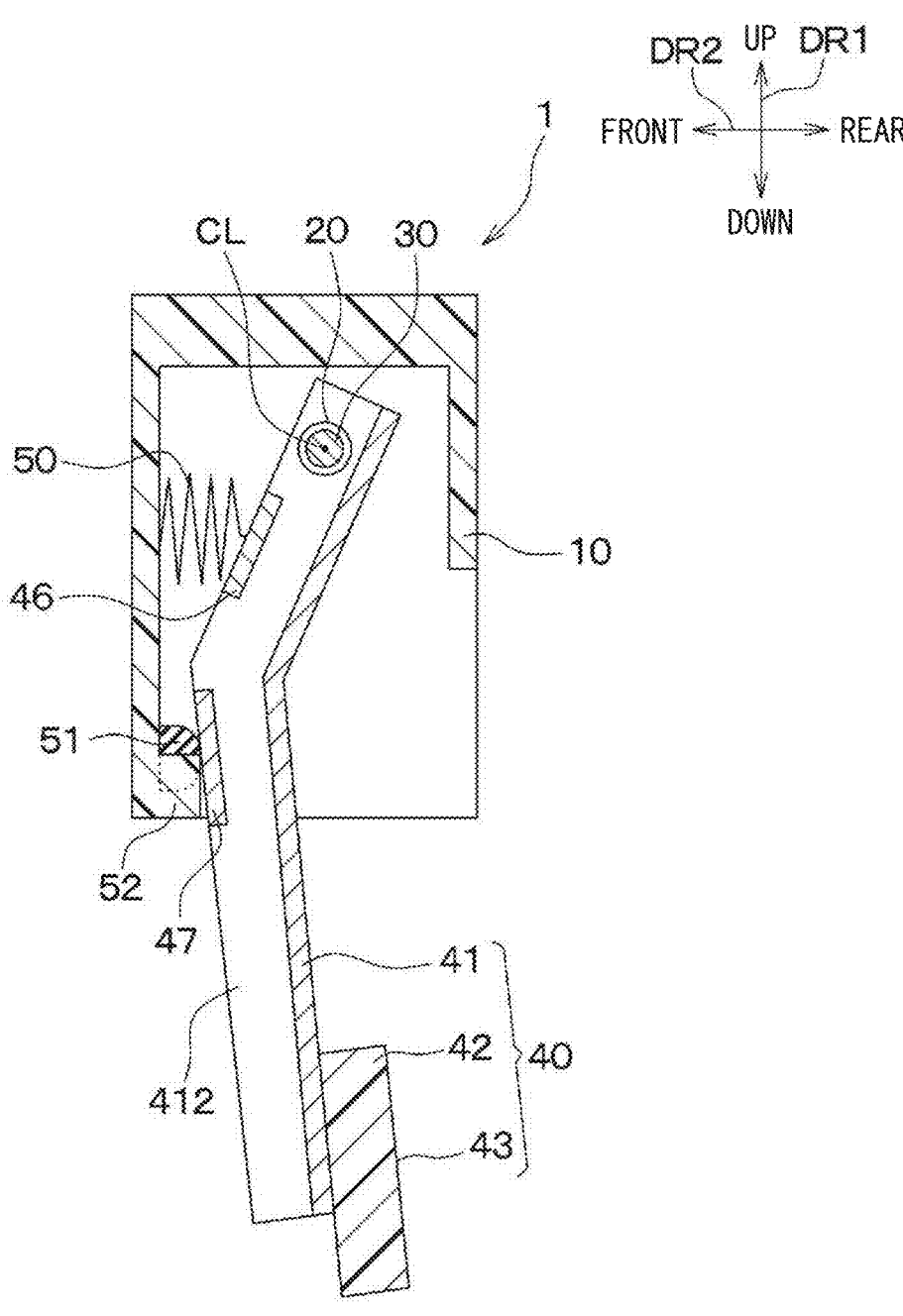
FIG. 10 is a cross-sectional view showing a state in which the brake pedal is depressed to its maximum stroke in the brake pedal device according to the second embodiment.

Subsequently, as shown in FIG. 10, when the driver applies further pedaling force to the brake pedal 40, a force acts on the elastic member 51 from the pressing portion 47 of the brake pedal 40, and the elastic member 51 is deformed. In such manner, when the elastic member 51 is not used, the feeling of bumping and collision that occurs when the restriction member 52 restricting the maximum stroke position contacts the pressing portion 47 of the pedal arm 41 is alleviated, and the feeling of the pedaling force is improved. In the second embodiment as well, the brake pedal device 1 includes the restriction member 52 that restricts the maximum stroke position of the brake pedal 40, and the position where the restriction member 52 and the brake pedal 40 come into contact is defined as the maximum stroke position.

Figure 11:
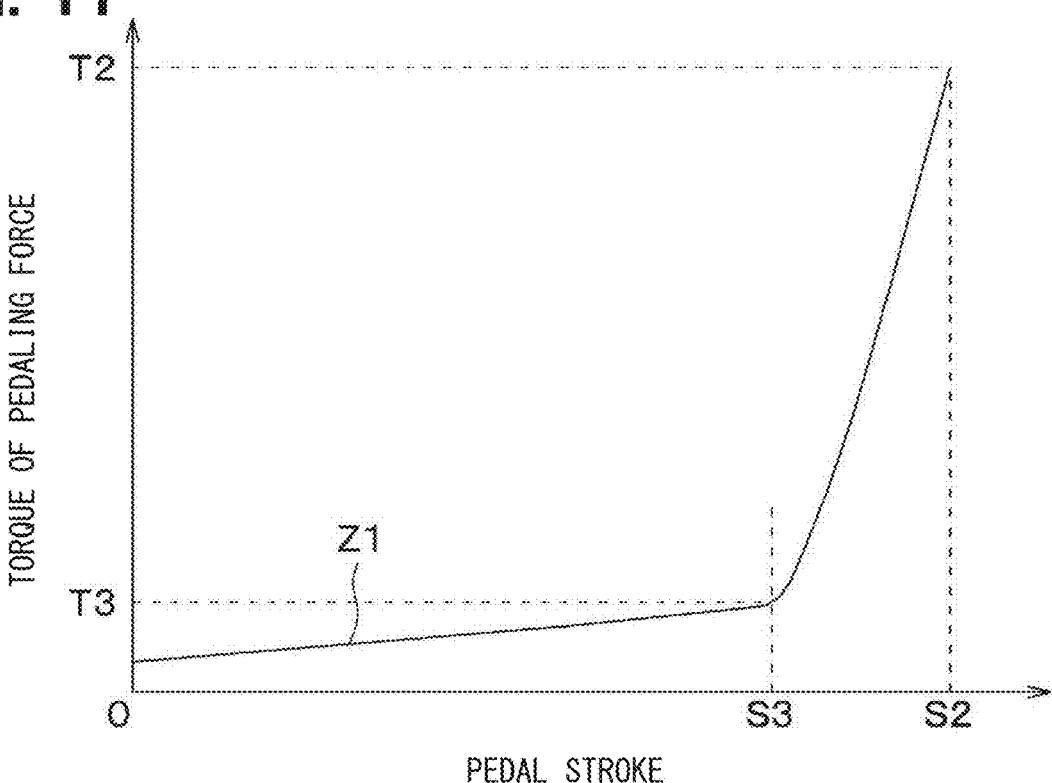
FIG. 11 is a graph showing the relationship between a pedal stroke and a pedaling force torque in the brake pedal device according to the second embodiment.

Here, FIG. 11 shows a relationship between the pedal stroke and the torque of the pedaling force when the driver applies a load to the tread 43 of the pedal pad 42 in a non-stuck state where the tubular member 20 and the shaft 30 are not stuck.

In a solid line Z1 in FIG. 11, while the pedal stroke is in a range from 0 to S3, the brake pedal 40 and the elastic member 51 are not in contact with each other. When the pedal stroke is S3, the brake pedal 40 and the elastic member 51 come into contact. When the pedal stroke is S2, the brake pedal 40 is at its maximum stroke position.

When the pedal stroke is from 0 to S3, the torque of the pedaling force increases as the reaction force generated by the reaction force generating mechanism 50 increases. In the graph of FIG. 11, the torque of the pedaling force when the pedal stroke is S3, that is, when the brake pedal 40 contacts the elastic member 51, is T3. In the description of the second embodiment, the torque at which the brake pedal 40 reaches the position where it contacts the elastic member 51 when a load is applied to the tread 43 of the pedal pad 42 with the tubular member 20 and the shaft 30 in a non-stuck state is phrased as follows. That is, such torque is referred to as "a torque of the pedaling force at a position where the brake pedal 40 contacts the elastic member 51 in a normal time."

When the pedal stroke is between S3 and S2, the torque of the pedaling force increases rapidly due to an increase in the reaction force generated by the reaction force generating mechanism 50 as well as an increase in the elastic force acting on the brake pedal 40 from the elastic member 51. In the graph of FIG. 11, when the pedal stroke is S2, that is, the brake pedal 40 is depressed to the maximum stroke position in a normal time, the torque of the pedaling force is T2.

Further to the first and second configurations described in the first embodiment, the brake pedal device 1 of the second embodiment can adopt a third configuration described below. The third configuration is a configuration in which the brake pedal device 1 includes the above-mentioned elastic member 51, and further includes the following configuration. That is, the third configuration is a configuration which includes the elastic member 51, and in which fixation between the inner wall of the portion 70 in the housing 10 and the tubular member 20 is released when a typical driver depresses the brake pedal 40 with a normal force in a stuck state where the tubular member 20 and the shaft 30 are stuck. In the configuration in which the brake pedal device 1 is provided with the elastic member 51, the torque when a typical driver depresses the brake pedal 40 with a normal force corresponds to a torque at which the brake pedal 40 comes to be in contact with the elastic member 51 when a load is applied to the tread 43 in a normal time.

Specifically, in the second embodiment, the torque (i.e., the unfixing torque) at which the fixation between the inner wall of the hole portion 70 and the tubular member 20 is released when a load is applied to the tread 43 of the pedal pad 42 in a stuck state where the tubular member 20 and the shaft 30 are stuck is set as follows in the above-mentioned third configuration.

That is, when adopting the third configuration described above, the brake pedal device 1 sets the unfixing torque to be greater than 0, and smaller than the torque of the pedaling force at the position where the brake pedal 40 contacts the elastic member 51 in a normal time.

Figure 12:
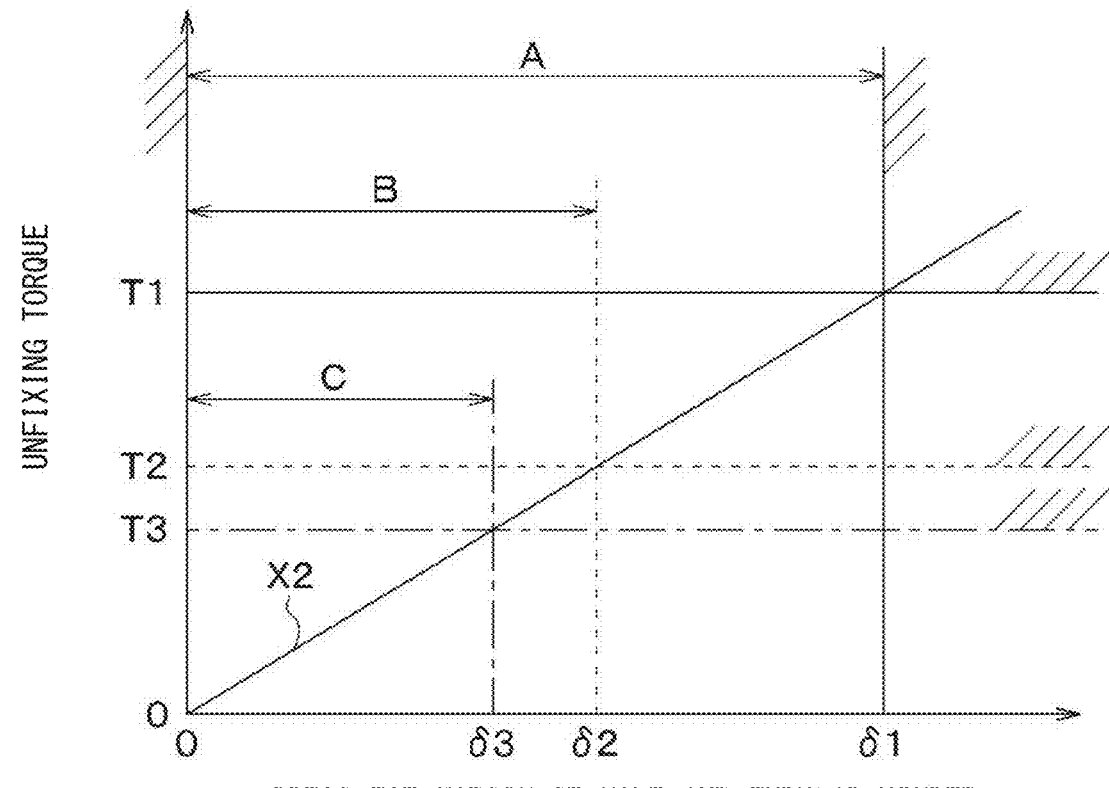
FIG. 12 is a graph showing a relationship between (i) a press-fit margin between a hole portion of a housing and a tubular member and (ii) a fixation release torque (unfixing torque) in the brake pedal device according to the second embodiment.

As shown by a solid line X2 in FIG. 12, the press-fit margin corresponding to the unfixing torque T3 is δ3. Therefore, when setting the unfixing torque in a range greater than 0 and smaller than the torque of the pedaling force at the position where the brake pedal 40 contacts the elastic member 51 in a normal time, the press-fit margin is in a range greater than 0 and smaller than δ3. In FIG. 12, the range of the press-fit margin in such case is indicated by a double-headed arrow C. In such manner, by setting the range of the press-fit margin to the range shown by the double-headed arrow C in FIG. 12, the third configuration described above can be realized.

In the brake pedal device 1 of the second embodiment, it is also possible to adopt the first configuration and the second configuration similarly to the first embodiment mentioned above.

That is, when the brake pedal device 1 adopts the first configuration, the unfixing torque is set to be greater than 0, and to be smaller than a torque that would damage at least a part of the brake pedal device 1 when a load is applied to the tread 43 in a state where the tubular member 20 and the shaft 30 are stuck. In such case, the above-mentioned first configuration can be realized by setting the range of the press-fit margin to a range shown by the double-headed arrow A in FIG. 12.

Further, when adopting the second configuration, the brake pedal device 1 sets the unfixing torque to be greater than 0, and smaller than the torque of the pedaling force at the maximum stroke position in a normal time. In such case, by setting the range of the press-fit margin to the range shown by the double-headed arrow B in FIG. 12, the above-mentioned second configuration can be realized.

The brake pedal device 1 of the second embodiment described above has the following configuration and the effects thereof, further to the effects described in the first embodiment.

The brake pedal device 1 of the second embodiment includes the elastic member 51 that is provided, over the entire operation range of the brake pedal 40, from a position midway between the initial position and the maximum stroke position to the maximum stroke position. In such a configuration of the brake pedal device 1 of the present disclosure, when the third configuration described above is adopted, the unfixing torque is set to be greater than 0, and smaller than the torque of the pedaling force at the position where the brake pedal 40 contacts the elastic member 51 in a normal time. According to the above, the brake pedal device 1 may include the elastic member 51 that comes into contact with the brake pedal 40 in the latter half of the pedal stroke in order to improve the feeling of pedaling force. In the brake pedal device 1 having such a configuration, the torque required for the brake pedal 40 to reach the maximum stroke position from the position where it contacts the elastic member 51 is set to be extremely high. Therefore, when the driver is a weak driver, it may be difficult to depress the brake pedal 40 until it reaches the maximum stroke position. On the other hand, the torque required to reach the position where the brake pedal 40 comes into contact with the elastic member 51 when a load is applied to the brake pedal 40 in a non-stuck state where the tubular member 20 and the shaft 30 are in a non-stuck state other is set to a pedaling force of a typical driver applicable to the brake pedal 40 with his/her normal force. It should be noted that when the brake pedal 40 is depressed to a position where it contacts with the elastic member 51, it is possible to sufficiently decelerate the vehicle. Therefore, when the third configuration is adopted in the second embodiment, even in case that the tubular member 20 and the shaft 30 are stuck together, if a typical driver depresses the brake pedal 40 with a normal force, it is configured that the fixation between the inner wall of the portion 70 of the fixed member and the tubular member 20 is releasable. Therefore, in such a brake pedal device 1, even when the tubular member 20 and the shaft 30 are unintentionally stuck together, a typical driver can depress and operate the brake pedal 40 with a normal force.

Third Embodiment

The following describes the third embodiment of the present disclosure. The third embodiment differs from the first embodiment and the like in that a part of the configuration of the tubular member 20 is changed from the first embodiment and the like, and other aspects are the same as the first embodiment and the like. Therefore, parts different from the first embodiment will only be explained.

Figure 13:
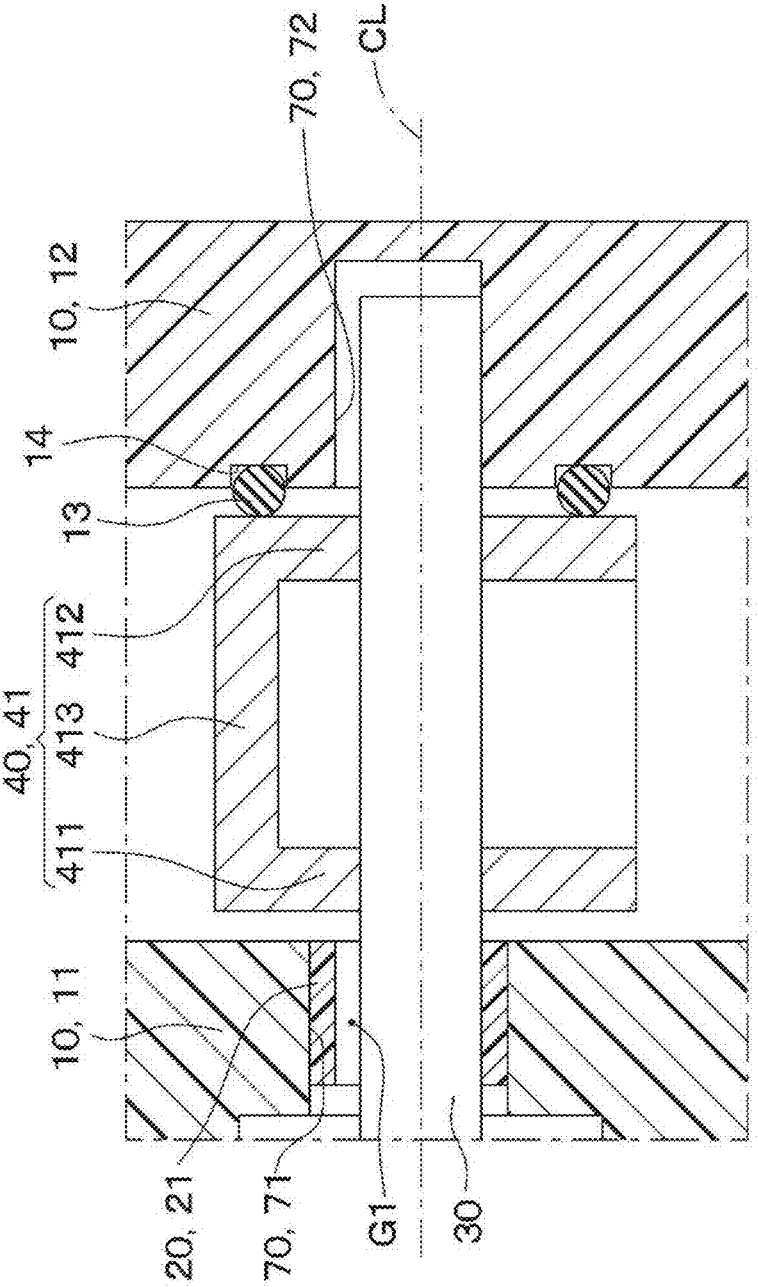
FIG. 13 is a cross-sectional view showing a portion corresponding to FIG. 5, in a brake pedal device according to a third embodiment.

As shown in FIG. 13, a brake pedal device 1 of the third embodiment includes a seal member 13 at a position between a second side plate 412 of a brake pedal 40 and a housing cover 12. The seal member 13 corresponds to an example of a foreign matter prevention structure that prevents foreign matter M1 from entering a second hole portion 72 provided in the housing cover 12.

Specifically, the seal member 13 is provided to surround a radial outside region of the shaft 30. Further, the seal member 13 is formed of, for example, an O-ring or the like, and is fitted into a groove 14 provided in the housing cover 12. The seal member 13 is not limited to an O-ring, but may also be configured such that, for example, a spring (not shown) and a seal member made of resin or the like are arranged in the groove 14, and the seal member is brought into close contact with the brake pedal 40 by the spring. With such a configuration, even when the brake pedal 40 and the shaft 30 are shifted in the axial direction, the seal member 13 itself elastically deforms to tightly contact the second side plate 412 and close the second hole portion, thereby it is possible to prevent foreign matter M1 from entering the second hole portion 72.

Further, the brake pedal device 1 of the third embodiment includes a first tubular member 21 inside a first hole portion 71 provided in a housing body 11, and does not include a second tubular member 22 in a second hole portion 72 provided in the housing cover 12. Therefore, a portion of the shaft 30 on a second hole portion 72 side is rotatably supported by the inner wall of the second hole portion 72.

The brake pedal device 1 of the third embodiment described above includes the seal member 13 as a foreign matter prevention structure at a position between the second side plate 412 of the brake pedal 40 and the housing cover 12. In such manner, the foreign matter M1 is prevented from entering the second hole portion 72 provided in the housing cover 12. Therefore, the brake pedal device 1 of the third embodiment does not include the second tubular member 22 in the second hole portion 72 of the housing cover 12. In such manner, the brake pedal device 1 is not required to insert the tubular member 20 into the first hole portion 71 or the second hole portion 72 provided in the housing 10, when the brake pedal device 1 has a structure that prevents foreign matter M1 from entering.

Although not shown, when the brake pedal device 1 includes a foreign matter prevention structure at a position between the first side plate 411 of the brake pedal 40 and the housing body 11 to prevent foreign matter M1 from entering the first hole portion 71, there is no need to provide the first tubular member 21 in the first hole portion 71. In such manner, the brake pedal device 1 of the third embodiment can have a simplified configuration.

Fourth Embodiment

The following describes the fourth embodiment of the present disclosure. The fourth embodiment differs from the first embodiment in that a part of the configuration of the brake pedal device 1 is changed, and is otherwise the same as the first embodiment, so the differences from the first embodiment only are explained. The brake pedal device 1 of the fourth embodiment does not include the elastic member 51 described in the second embodiment.

Figure 14:
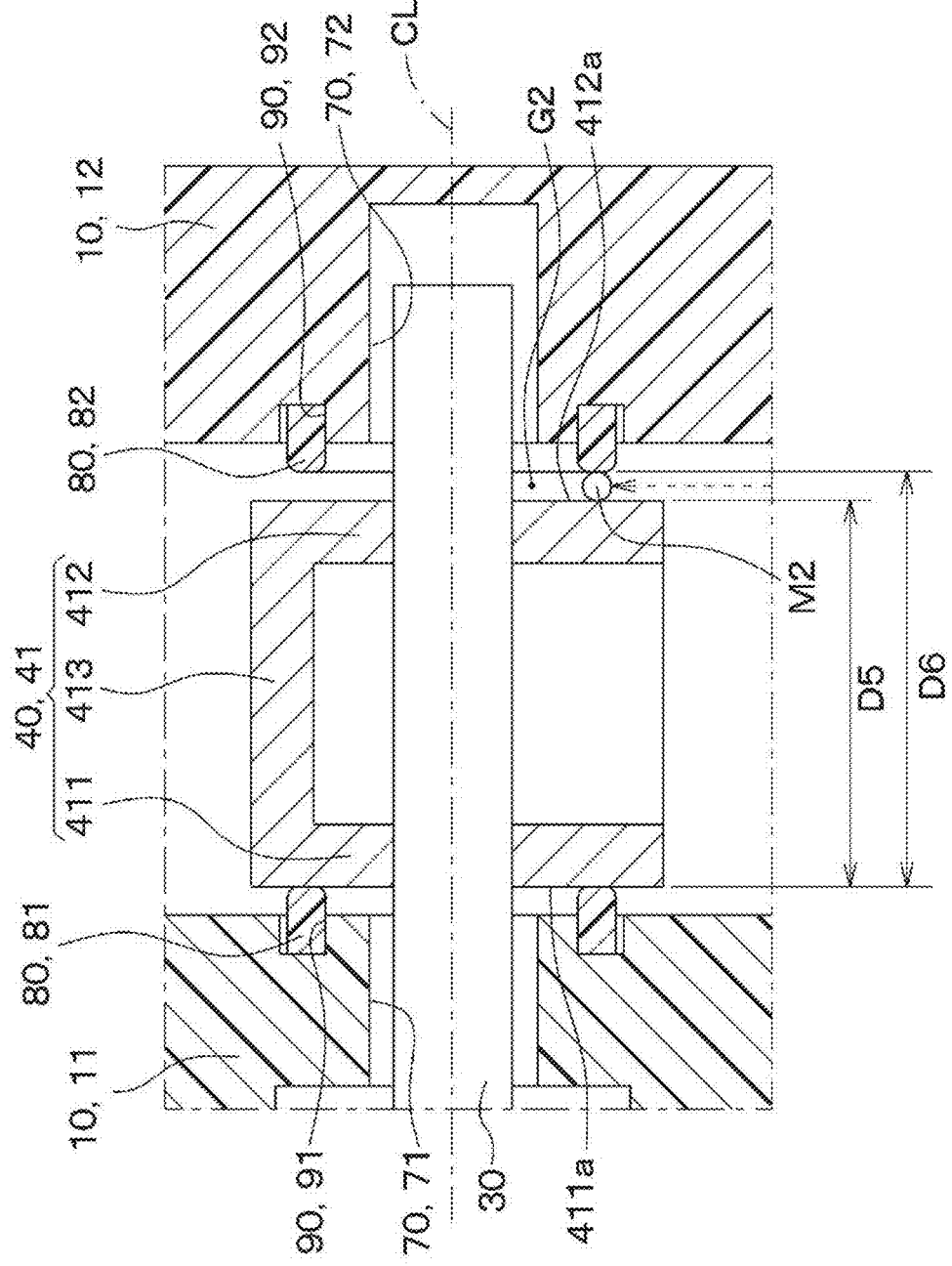
FIG. 14 is a cross-sectional view showing a portion corresponding to FIG. 5, in a brake pedal device according to a fourth embodiment.

As shown in FIG. 14, the brake pedal device 1 of the fourth embodiment does not include the tubular member 20 described in the first embodiment and the like, but instead includes a restricting member 80. The restricting member 80 is provided at a position between a first side wall 411 of the brake pedal 40 and a housing body 11, and also at a position between a second side wall 412 of the brake pedal 40 and the housing cover 12. The restricting member 80 is also called as a thrust bearing that supports a load acting in a direction in which an axis CL extends (i.e., the axial direction). The restricting member 80 may be made of metal, resin, ceramic, or the like, for example. In the following description, the restricting member 80 provided on the housing body 11 may be referred to as a first restricting member 81, and the restricting member 80 provided on the housing cover 12 may be referred to as a second restricting member 82. Both of the first restricting member 81 and the second restricting member 82 are formed in an annular shape, and are provided to surround a radial outside region of the shaft 30. Further, the first restricting member 81 and the second restricting member 82 restrict a movable range of the shaft 30 and the brake pedal 40 in the axial direction.

A first annular groove 91 into which the first restricting member 81 is fitted is provided on a surface of the housing body 11 facing the first side plate 411. The first annular groove 91 is provided to surround the radial outside region of the shaft 30. The first restricting member 81 is fixed to the first annular groove 91 by press-fitting.

A second annular groove 92 into which the second restricting member 82 is fitted is provided on a surface of the housing cover 12 facing the second side plate 412. The second annular groove 92 is provided to surround the radial outside region of the shaft 30. The second restricting member 82 is fixed to the second annular groove 92 by press-fitting. In the following description, the first annular groove 91 and the second annular groove 92 may be collectively referred to as an annular groove 90. In FIG. 14, regarding the press-fitting between the restricting member 80 and the annular groove 90, a configuration state is shown in which the surface of the restricting member 80 facing radially inward and the surface of the annular groove 90 in the housing 10 facing outward in the radial direction are press-fitted. However, configuration is not limited thereto. For example, it is also possible to adopt a configuration in which the surface of the restricting member 80 facing outward in the radial direction and the surface of the annular groove 90 in the housing 10 facing radially inward are press-fitted to each other. Such a configuration also applies to FIGS. 19, 20, 21, 26, 28, and 30, which will be referred to in the respective embodiments described later.

A distance D6 between the first restricting member 81 and the second restricting member 82 is greater than an outer width D5 of the brake pedal 40 in the axial direction. The outer width D5 of the brake pedal 40 in the axial direction is a distance between a surface 411a of the first side plate 411 facing the housing body 11 and a surface 412a of the second side plate 412 facing the housing cover 12. Thereby, a predetermined gap G2 is provided at a position between (a) the surfaces 411a, 412a of the brake pedal 40 facing in the axial direction and (b) the restricting member 80, allowing the brake pedal 40 and the shaft 30 to rotate around the axis with respect to the restricting member 80. Specifically, in FIG. 14, the predetermined gap G2 is provided at a position between (a) the surface 412a of the second side plate 412 facing the housing cover 12 and (b) the second restricting member 82 for a rotation of the brake pedal 40 and the shaft 30 around the axis with respect to the restricting member 80. Alternatively, the predetermined gap G2 may be provided at a position between (a) the surface 411a of the first side plate 411 facing the housing body 11 and (b) the first restricting member 81, in which the brake pedal 40 and the shaft 30 can rotate around the axis with respect to the restricting member 80. The brake pedal 40 is movable in the axial direction between the first restricting member 81 and the second restricting member 82. In FIG. 14, for convenience of explanation, the situation is shown that the first side plate 411 of the brake pedal 40 and the first restricting member 81 are in contact, and the gap G2 is created between the second side plate 412 of the brake pedal 40 and the second restricting member 82.

The distance D6 between the first restricting member 81 and the second restricting member 82 is set such that, even when the restricting member 80, the housing 10, the brake pedal 40, or the like expand and contract due to changes in environmental temperature, the distance D6 maintains a state that the distance D6 is greater than the outer width D5 along the axial direction. Therefore, even when the restricting member 80, the housing 10, the brake pedal 40, and the like expand and contract due to changes in the environmental temperature, the gap G2 between the first side plate 411 of the brake pedal 40 and the first restricting member 81 will not disappear. Alternatively, even when the restricting member 80, housing 10, brake pedal 40, and the like expand and contract due to a change in the environmental temperature, the gap G2 between the second side plate 412 of the brake pedal 40 and the second restricting member 82 does not disappear. Therefore, in such brake pedal device 1, the feeling of the pedaling force when the driver depresses the brake pedal 40 does not change and remains constant regardless of changes in the environmental temperature.

However, by providing the gap G2 between the axially facing surfaces 411a, 412a of the brake pedal 40 and the restricting member 80, as shown by a broken line arrow in FIG. 14, there is a risk of foreign matter M2 from entering into the gap G2. The foreign matter M2 is, for example, sand, dirt, or the like. When the brake pedal 40 and the restricting member 80 become stuck and do not rotate due to the foreign matter M2 getting caught, there is a concern that the driver will be unable to depress and operate the brake pedal 40, which may cause a problem in the braking of the vehicle. The stuck state between the brake pedal 40 and the restricting member 80 is not limited to the above-mentioned foreign matter M2 getting caught, but may also be a situation like the gap G2 between the brake pedal 40 and the restricting member 80 being unintentionally made small, causing the brake pedal 40 and the restricting member 80 to stick to each other due to temperature changes. Alternatively, the brake pedal 40 may become rusty, causing the brake pedal 40 and the restricting member 80 to become stuck together.

In contrast, in the fourth embodiment, even when the brake pedal 40 and the restricting member 80 are stuck together, when the driver depresses the brake pedal 40, it is configured that the fixation between the inner wall of the annular groove 90 and the restricting member 80 is releasable before at least a part of the brake pedal device 1 is damaged. Hereinafter, such a configuration will be referred to as a "fourth configuration."

Further, in the fourth embodiment, it may be configured that, when a typical driver depresses the brake pedal 40 with a normal force in a state where the brake pedal 40 and the restricting member 80 are stuck together, the fixation between the inner wall of the annular groove 90 in the housing 10 and the restricting member 80 is releasable. Hereinafter, such a configuration will be referred to as a "fifth configuration." In case where the brake pedal device 1 does not include the elastic member 51 as in the first embodiment, the torque when a typical driver depresses the brake pedal 40 with a normal force corresponds to a torque at which the brake pedal 40 reaches the maximum stroke position on the depression side.

Specifically, in the fourth embodiment, the torque that releases the fixation between the inner wall of the annular groove 90 and the restricting member 80 when a load is applied to the tread 43 of the pedal pad 42 in a state where the restricting member 80 and the shaft 30 are stuck together is set as follows for the fourth and fifth configurations. In the following explanation, the torque that releases the fixation between the inner wall of the annular groove 90 and the restricting member 80 when a load is applied to the tread 43 of the pedal pad 42 in a state where the restricting member 80 and the shaft 30 are stuck together will be designated as a "thrust unfixing torque."

When adopting the above-described fourth configuration, the thrust unfixing torque is set to be greater than 0, and is set to be smaller than the torque that will cause damage at least to a part of the brake pedal devices 1 when a load is applied to the tread 43 in a state where the brake pedal 40 and the restricting member 80 stuck together. In the specification of the present disclosure, the thrust unfixing torque being greater than 0 means that it is substantially greater than 0, and, more specifically, is greater than the frictional force generated between the brake pedal 40 and the restricting member 80 in a non-stuck state where the brake pedal 40 and the restricting member 80 are not stuck together.

Figure 15:
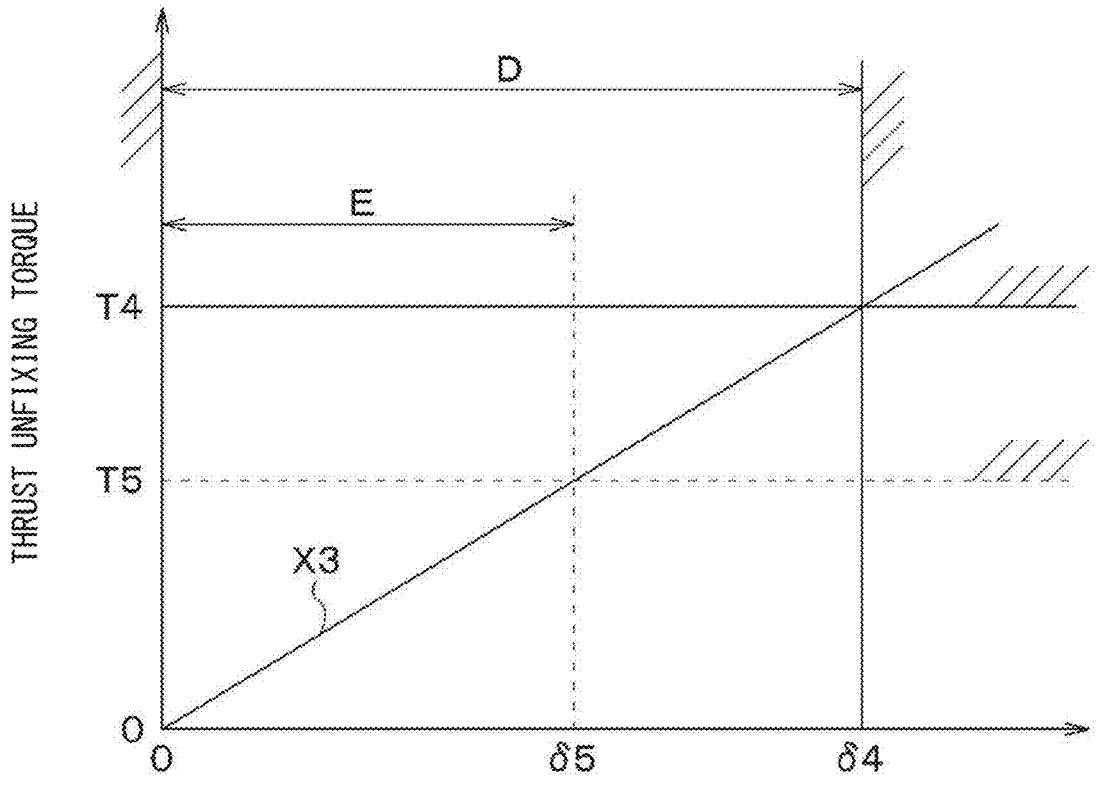
FIG. 15 is a graph showing a relationship between (i) a press-fit margin between an annular groove of a housing and a restricting member and (ii) a thrust unfixing torque, in the brake pedal device according to the fourth embodiment.

Here, FIG. 15 shows a relationship between the restricting member press-fit margin and the thrust unfixing torque, with the horizontal axis representing the restricting member press-fit margin and the vertical axis representing the thrust unfixing torque. The restricting member press-fit margin is a press-fit margin between the inner wall of the annular groove 90 in the housing 10 and the outer wall of the restricting member 80. As shown by a solid line X3 in FIG. 15, as the restricting member press-fit margin increases, the thrust unfixing torque also increases.

When the thrust unfixing torque is greater than T4, at least a part of the brake pedal device 1 will be damaged when a load is applied to the tread 43 of the pedal pad 42 in a state where the brake pedal 40 and the restricting member 80 are stuck together. The torque T4 is determinable through experiments or the like. In FIG. 15, the restricting member press-fit margin corresponding to the thrust unfixing torque T4 is δ4. Therefore, when the thrust unfixing torque is set to be in a range greater than 0 and smaller than the torque at which at least a part of the brake pedal device 1 is damaged, the restricting member press-fit margin is set to be in a range greater than 0 and smaller than δ4. In FIG. 15, the range of the press-fit margin of the restricting member in such case is indicated by a double-headed arrow D. In such manner, the fourth configuration described above can be realized by setting the range of the press-fit margin of the restricting member to be in a range shown by the double-headed arrow D in FIG. 15.

On the other hand, when adopting the fifth configuration described above, the brake pedal device 1 sets the thrust unfixing torque to be greater than 0 and smaller than the torque of the pedaling force at the maximum stroke position in a normal time. In the description of the fourth embodiment, the "torque of the pedaling force at the maximum stroke position in a normal time" means a torque at which the brake pedal 40 reaches the maximum stroke position on the depression side when a load is applied to the tread 43 in a non-stuck state where the brake pedal 40 and the restricting member 80 are not stuck together.

Figure 16:
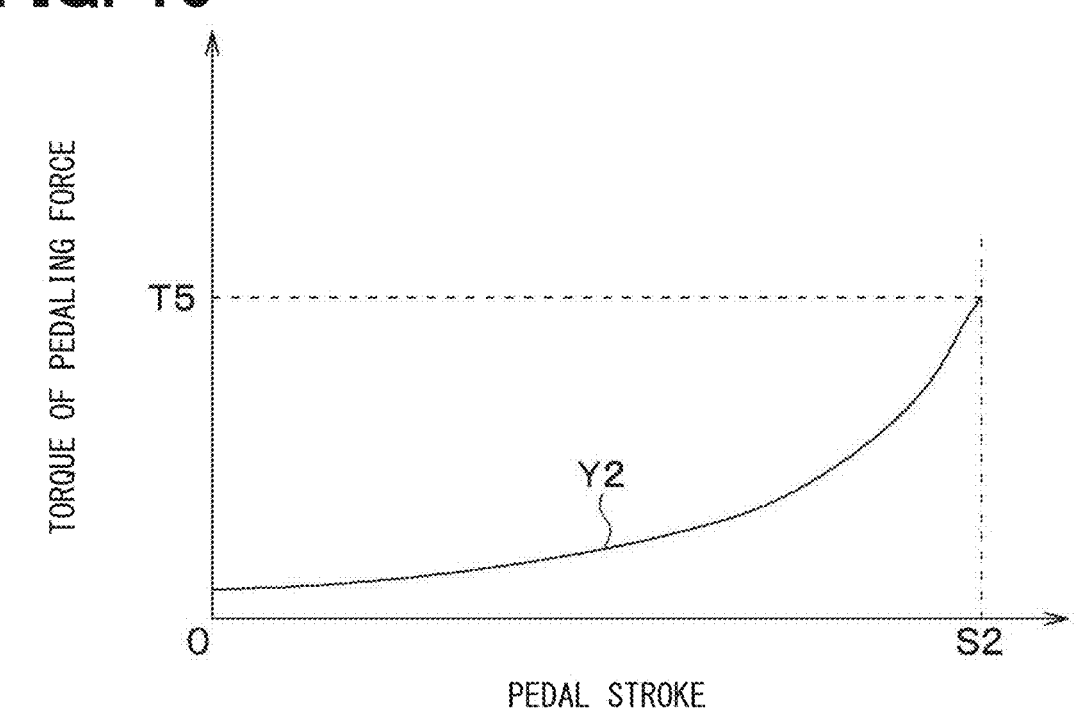
FIG. 16 is a graph showing a relationship between a pedal stroke and a pedaling force torque in the brake pedal device according to the fourth embodiment.

Here, FIG. 16 shows a relationship between the pedal stroke and the torque of the pedaling force when the driver applies a load to the tread 43 of the pedal pad 42 in a non-stuck state where the brake pedal 40 and the restricting member 80 are not stuck together. In this case, the torque of the pedaling force is a torque that is applied to the pedal pad 42 when the driver depresses the brake pedal 40. More specifically, the torque of the pedaling force is a product of the reaction force generated by the reaction force generating mechanism 50 and a distance from the axis CL of the shaft 30 to the tread 43 of the pedal pad 42.

As shown by a solid line Y2 in FIG. 16, as the pedal stroke becomes greater, the reaction force generated by the reaction force generating mechanism 50 becomes greater, and therefore the torque of the pedaling force becomes greater. When the pedal stroke is S2, the brake pedal 40 is at its maximum stroke position. In the graph of FIG. 16, the torque of the pedaling force at the maximum stroke position in a normal time is T5.

As shown in FIG. 15 again, the restricting member press-fit margin corresponding to the thrust unfixing torque T5 is δ5. Therefore, when the thrust unfixing torque is set in a range greater than 0 and smaller than the torque of the pedaling force at the maximum stroke position in a normal time, the restricting member press-fit margin is set in a range greater than 0 and smaller than δ5. In FIG. 15, the range of the press-fit margin for the restricting member in such case is indicated by a double-headed arrow E. In such manner, by setting the range of the press-fit margin of the restricting member to a range indicated by the double-headed arrow E in FIG. 15, the above-mentioned fifth configuration can be realized.

The brake pedal device 1 of the fourth embodiment described above has the following configuration and effects derived therefrom.

(1) In the brake pedal device 1 of the fourth embodiment, the predetermined gap G2 is provided at a position between the restricting member 80 provided in the housing 10 and the surfaces 411*a* and 412*a* of the brake pedal 40 facing in the axial direction. In such manner, it is possible to maintain a constant feeling of the pedaling force when the driver depresses the brake pedal 40, regardless of changes in the environmental temperature. Further, in the fourth embodiment, when the fourth configuration described above is adopted, the thrust unfixing torque is set to be smaller than a torque that damages at least a part of the brake pedal device 1 when a load is applied to the tread 43 in a state where the brake pedal 40 and the restricting member 80 are stuck together. According to the above, even in case that the brake pedal 40 and the restricting member 80 are unintentionally stuck together due to foreign matter M2 being caught or the like, for example, when the driver depresses the brake pedal 40, fixation between (i) the inner wall of the annular groove 90 in the housing 10 and (ii) the restricting member is released, and the brake pedal 40 rotates. At such time, the fixation between the inner wall of the annular groove 90 in the housing 10 and the restricting member 80 is released and the brake pedal 40 rotates before at least a part of the brake pedal device 1 is damaged. Therefore, the brake pedal device 1 of the present disclosure eliminates changes in the feeling of the pedaling force due to changes in the environmental temperature, and allows the brake pedal 40 to be depressed and operated even when the brake pedal 40 and the restricting member 80 are unintentionally stuck together. Therefore, the brake pedal device 1 of the present disclosure is capable of improving the driver's feeling of the pedaling force and is also capable of raising safety level of vehicle braking by the driver's operation of the brake pedal 40.

(2) When the brake pedal device 1 of the fourth embodiment employs the above-described fifth configuration, the thrust unfixing torque is set to be greater than 0 and smaller than the torque of the pedaling force at the maximum stroke position in a normal time. In the case of the brake pedal device 1 that does not have the elastic member 51 described in the above-described second embodiment, the torque of the pedaling force at the maximum stroke position in a normal time is generally set as a torque of the pedaling force in which a typical driver can apply to the brake pedal 40 with a normal force. Therefore, in the fourth embodiment using the fifth configuration, even if the brake pedal 40 and the restricting member 80 become stuck, the fixation between the annular groove 90 and the restricting member 80 is released when a typical driver depresses the brake pedal 40 with a normal force, and thereby the brake pedal 40 rotates. Therefore, with the brake pedal device 1 of the present disclosure, even when the restricting member 80 and the brake pedal 40 are unintentionally stuck together, a typical driver can depress and operate the brake pedal 40 with a normal force.

(3) In the brake pedal device 1 of the fourth embodiment, the inner wall of the annular groove 90 provided in the housing 10 and the restricting member 80 are fixed to each other by press-fitting. According to the above, by setting the press fit margin between the inner wall of the annular groove 90 in the housing 10 and the outer wall of the restricting member 80, it is possible to release the fixation by applying a predetermined torque while the annular groove 90 in the housing 10 and the restricting member 80 are put in a fixed state during a normal time. That is, the inner wall of the annular groove 90 in the housing 10 and the restricting member 80 can be easily fixed by press-fitting, thereby reducing the assembly costs of manufacturing.

Fifth Embodiment

The following describes the fifth embodiment of the present disclosure. The fifth embodiment differs from the fourth embodiment in that a part of the configuration of the brake pedal device 1 is changed, and the rest is the same as the fourth embodiment, so the differences from the fourth embodiment are only explained. The brake pedal device 1 of the fifth embodiment includes the elastic member 51 described in the second embodiment.

Figure 17:
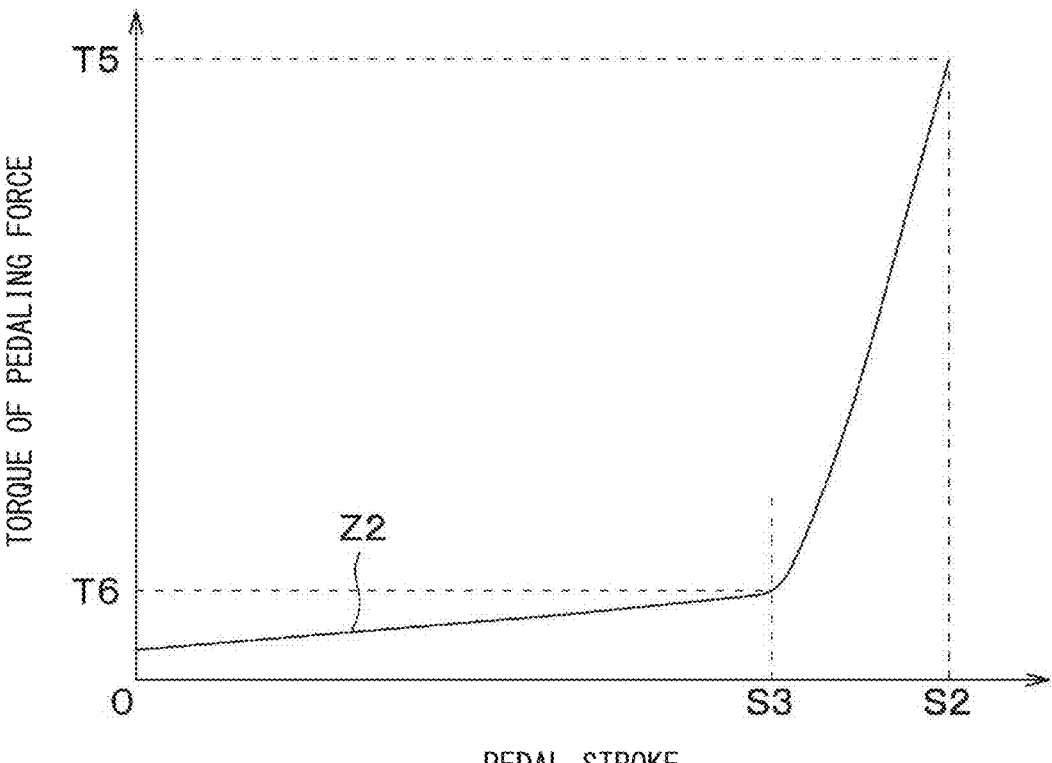
FIG. 17 is a graph showing a relationship between a pedal stroke and a pedaling force torque in the brake pedal device according to a fifth embodiment.

FIG. 17 shows a relationship between the pedal stroke and the torque of the pedaling force when the driver applies a load to the tread 43 of the pedal pad 42 while the brake pedal 40 and the restricting member 80 are in a non-stuck state.

In a solid line Z2 in FIG. 17, the brake pedal 40 and the elastic member 51 are not in contact during the pedal stroke from 0 to S3. When the pedal stroke is S3, the brake pedal 40 and the elastic member 51 come into contact. When the pedal stroke is S2, the brake pedal 40 is at its maximum stroke position.

When the pedal stroke is from 0 to S3, the torque of the pedaling force increases as the reaction force generated by the reaction force generating mechanism 50 increases. In a graph of FIG. 17, the torque of the pedaling force when the pedal stroke is S3, that is, when the brake pedal 40 contacts the elastic member 51, is T6. Further, in the description of the fifth embodiment, the torque at which the brake pedal 40 contacts the elastic member 51 when a load is applied to the tread 43 of the pedal pad 42 in a non-stuck state, where the brake pedal 40 and the restricting member 80 are not stuck, is referred to as follows: That is, such torque is referred to as "a torque of the pedaling force at a position where the brake pedal 40 contacts the elastic member 51 in a normal time."

When the pedal stroke is between S3 and S2, the torque of the pedaling force increases rapidly due to an increase in the reaction force generated by the reaction force generating mechanism 50 as well as an increase in the elastic force acting on the brake pedal 40 from the elastic member 51. In the graph of FIG. 17, when the pedal stroke is S2, that is, when the brake pedal 40 is depressed to the maximum stroke position in a normal time, the torque of the pedaling force is T5.

Further to the fourth and fifth configurations described in the fourth embodiment, the brake pedal device 1 of the fifth embodiment can adopt a sixth configuration described below. The sixth configuration is a configuration in which the brake pedal device 1 includes the above-mentioned elastic member 51, and further includes the following configuration. That is, the sixth configuration is a configuration including the elastic member 51, in which, when a typical driver depresses the brake pedal 40 with a normal force in a state where the brake pedal 40 and the restricting member 80 are stuck together, fixation between the inner wall of the annular groove 90 in the housing 10 and the restricting member 80 is releasable. In the configuration in which the brake pedal device 1 includes the elastic member 51, the torque when a typical driver depresses the brake pedal 40 with a normal force corresponds to a torque at which the brake pedal 40 comes to be in contact with the elastic member 51 when a load is applied to the tread 43 in a normal time.

Specifically, in the fifth embodiment, the torque of releasing the fixation between the inner wall of the annular groove 90 and the restricting member 80 when a load is applied to the tread 43 in a state where the brake pedal 40 and the restricting member 80 are stuck together is set to a torque (i.e., the thrust unfixing torque) as follows in the above-mentioned sixth configuration.

That is, when adopting the sixth configuration described above, the brake pedal device 1 sets the thrust unfixing torque to be greater than 0 and smaller than the torque of the pedaling force at the position where the brake pedal 40 contacts the elastic member 51 in a normal time.

Figure 18:
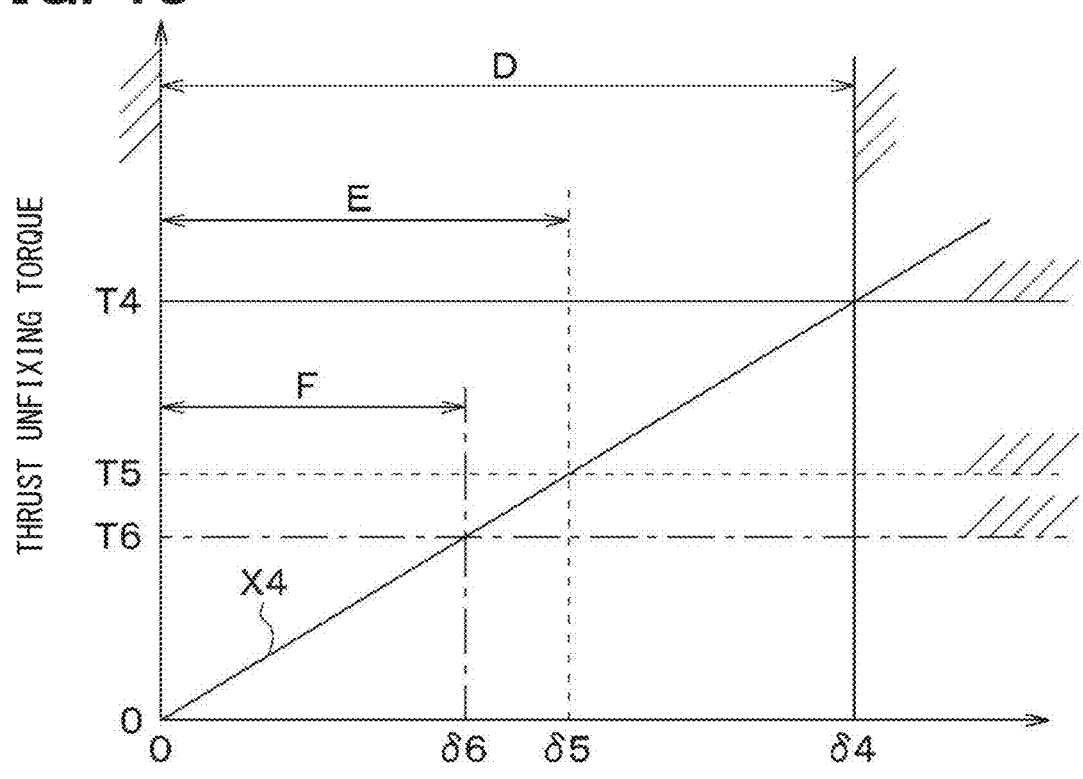
FIG. 18 is a graph showing a relationship between (i) a press-fit margin between an annular groove of a housing and a restricting member and (ii) a thrust unfixing torque in the brake pedal device according to the fifth embodiment.

As shown by a solid line X4 in FIG. 18, the restricting member press-fit margin corresponding to the thrust unfixing torque T6 is δ6. Therefore, when the thrust unfixing torque is set to be in a range greater than 0 and smaller than the torque of the pedaling force at the position where the brake pedal 40 contacts the elastic member 51 in a normal time, the restricting member press-fit margin is set to be in a range greater than 0 and smaller than δ6. In FIG. 18, the range of the press-fit margin for the restricting member in such case is indicated by a double-headed arrow F. In such manner, by setting the range of the press-fit margin of the restricting member to be in the range indicated by the double-headed arrow F in FIG. 18, the above-mentioned sixth configuration can be realized.

In the brake pedal apparatus 1 of the fifth embodiment, it is also possible to adopt the fourth configuration or the fifth configuration, similarly to the fourth embodiment mentioned above.

That is, in a case where the fourth configuration is used, the thrust unfixing torque is set to be greater than 0 and smaller than a torque that damages at least a part of the brake pedal device 1 when a load is applied to the tread 43 in a state where the brake pedal 40 and the restricting member 80 are stuck together. In such case, the above-mentioned fourth configuration can be realized by setting the range of the press-fit margin of the restricting member to the range indicated by the double-headed arrow D in FIG. 18.

Further, when adopting the fifth configuration, the brake pedal device 1 sets the thrust unfixing torque to be greater than 0 and smaller than the torque of the pedaling force at the maximum stroke position in a normal time. In such case, the fifth configuration described above can be realized by setting the range of the press-fit margin of the restricting member to the range shown by the double-headed arrow E in FIG. 18.

The brake pedal device 1 of the fifth embodiment described above has the following configuration and the effects derivable therefrom, further to the effects described in the fourth embodiment.

The brake pedal device 1 of the fifth embodiment includes the elastic member 51 that is provided for a range in the entire operation range of the brake pedal 40 (i) from a position midway between the initial position and the maximum stroke position (ii) to the maximum stroke position. In such a configuration of the brake pedal device 1 of the present disclosure, when the above-mentioned sixth configuration is adopted, the thrust unfixing torque is set to be greater than 0 and smaller than the torque of the pedaling force at the position where the brake pedal 40 contacts the elastic member 51 in a normal time. According to the above, the brake pedal device 1 may include the elastic member 51 that comes into contact with the brake pedal 40 in the latter half of the pedal stroke in order to improve the feeling of pedaling force. In the brake pedal device 1 having such a configuration, the torque required for the brake pedal 40 to reach the maximum stroke position from the position where it contacts the elastic member 51 is set to be extremely high. Therefore, when the driver is a weak driver, it may be difficult to depress the brake pedal 40 until it reaches the maximum stroke position. On the other hand, the torque at which the brake pedal 40 reaches the position where the brake pedal 40 contacts the elastic member 51 when a load is applied to the brake pedal 40 in a non-stuck state where the brake pedal 40 and the restricting member 80 are not stuck is set to a torque of the pedaling force that is applicable to the brake pedal 40 by a typical driver with a normal force. It should be noted that when the brake pedal 40 is depressed to a position where it contacts with the elastic member 51, it is possible to sufficiently decelerate the vehicle. Therefore, in the fifth embodiment, when adopting the sixth configuration, even in case that the brake pedal 40 and the restricting member 80 are stuck together, it is configured that, when a typical driver depresses the brake pedal 40 with a normal force, the fixation between the inner wall of the annular groove 90 and the restricting member 80 is released. Therefore, in such brake pedal device 1, even when the restricting member 80 and the shaft 30 are unintentionally stuck together, a typical driver can depress and operate the brake pedal 40 with a normal force.

Sixth Embodiment

The following describes the sixth embodiment of the present disclosure. The sixth embodiment differs from the fourth and fifth embodiments in that a part of the configuration of the restricting member 80 is changed, and is otherwise the same as the fourth and fifth embodiments. Thus, only the parts different from the fourth and fifth embodiments will be explained.

Figure 19:
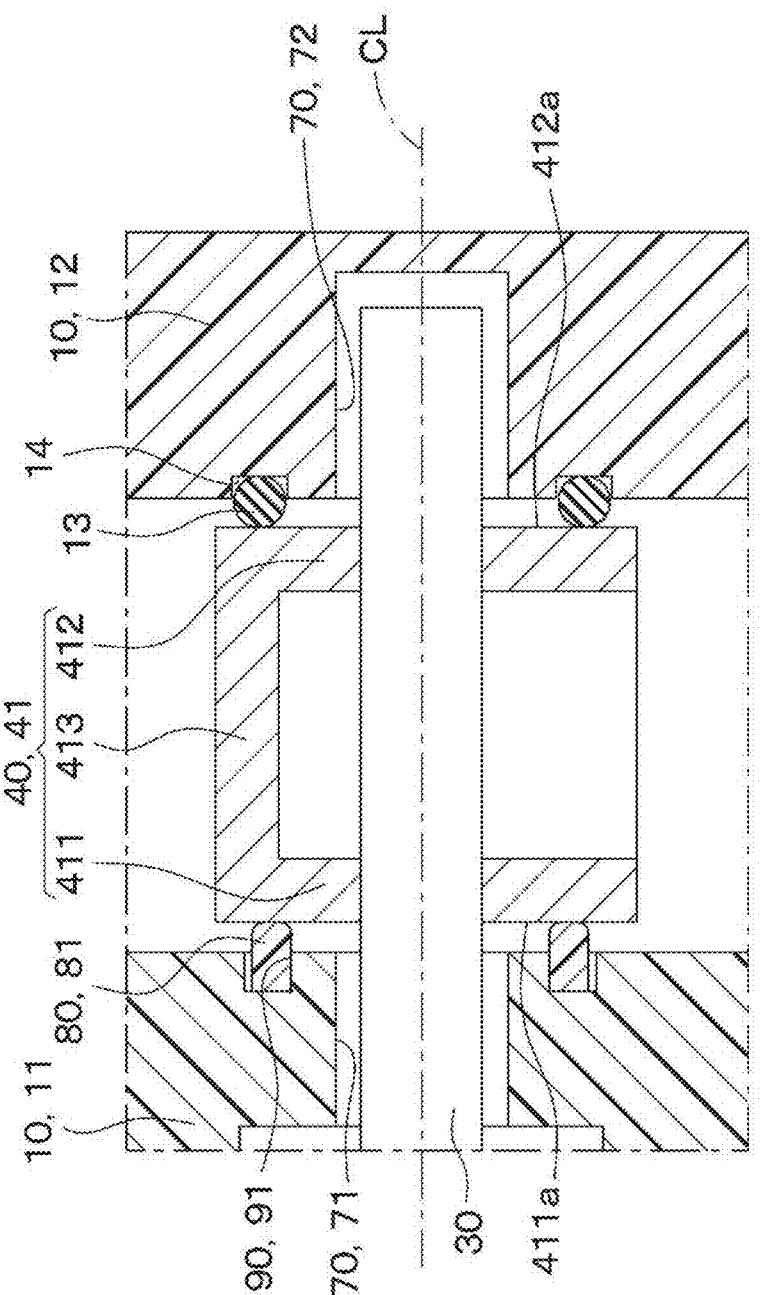
FIG. 19 is a cross-sectional view showing a portion corresponding to FIG. 5, in a brake pedal device according to a sixth embodiment.

As shown in FIG. 19, a brake pedal device 1 of the sixth embodiment includes a seal member 13 provided at a position between a second side plate 412 of a brake pedal 40 and a housing cover 12. The seal member 13 corresponds to an example of a foreign matter prevention structure that prevents foreign matter M2 from entering a second hole portion 72 provided in the housing cover 12.

Specifically, the seal member 13 is provided to surround a radial outside region of a shaft 30. Further, the seal member 13 is formed of, for example, an O-ring or the like, and is fitted into a groove 14 provided in the housing cover 12. Even when the brake pedal 40 and the shaft 30 are shifted in the axial direction, the seal member 13 is elastically deformed and comes into close contact with the second side plate 412, thereby preventing the foreign matter M2 to enter the second hole portion 72.

Further, the brake pedal device 1 of the sixth embodiment includes a first restricting member 81 at a position between the housing body 11 and a first side plate 411, and does not include the second restricting member 82 at a position between the housing cover 12 and the second side plate 412.

The brake pedal device 1 of the sixth embodiment described above includes the seal member 13 at a position between the second side plate 412 of the brake pedal 40 and the housing cover 12 as a foreign matter prevention structure. In such manner, the foreign matter M2 is prevented from entering a gap between the second side plate 412 and the housing cover 12. Therefore, the brake pedal device 1 of the sixth embodiment does not include the second restricting member 82 provided at a position between the second side plate 412 and the housing cover 12. In such manner, when the brake pedal device 1 is structured to prevent the foreign matter M2 to enter a gap between the housing 10 and the brake pedal 40, there is no need to include the first restricting member 81 or the second restricting member 82.

Although not shown in the drawing, the brake pedal device 1 does not need to have the first restricting member 81 when (a) it has a foreign matter prevention structure between the first side plate 411 of the brake pedal 40 and the housing main body 11, and (b) such a structure prevents the foreign matter M2 from entering therethrough. In such manner, the brake pedal device 1 of the sixth embodiment can have a simplified configuration.

Seventh Embodiment

The following describes the seventh embodiment of the present disclosure. The seventh embodiment differs from the fourth and fifth embodiments in that a part of the configuration of the restricting member 80 is changed, and the rest is the same as the fourth and fifth embodiments. Therefore, only the parts different from the fourth and fifth embodiments will be explained.

Figure 20:
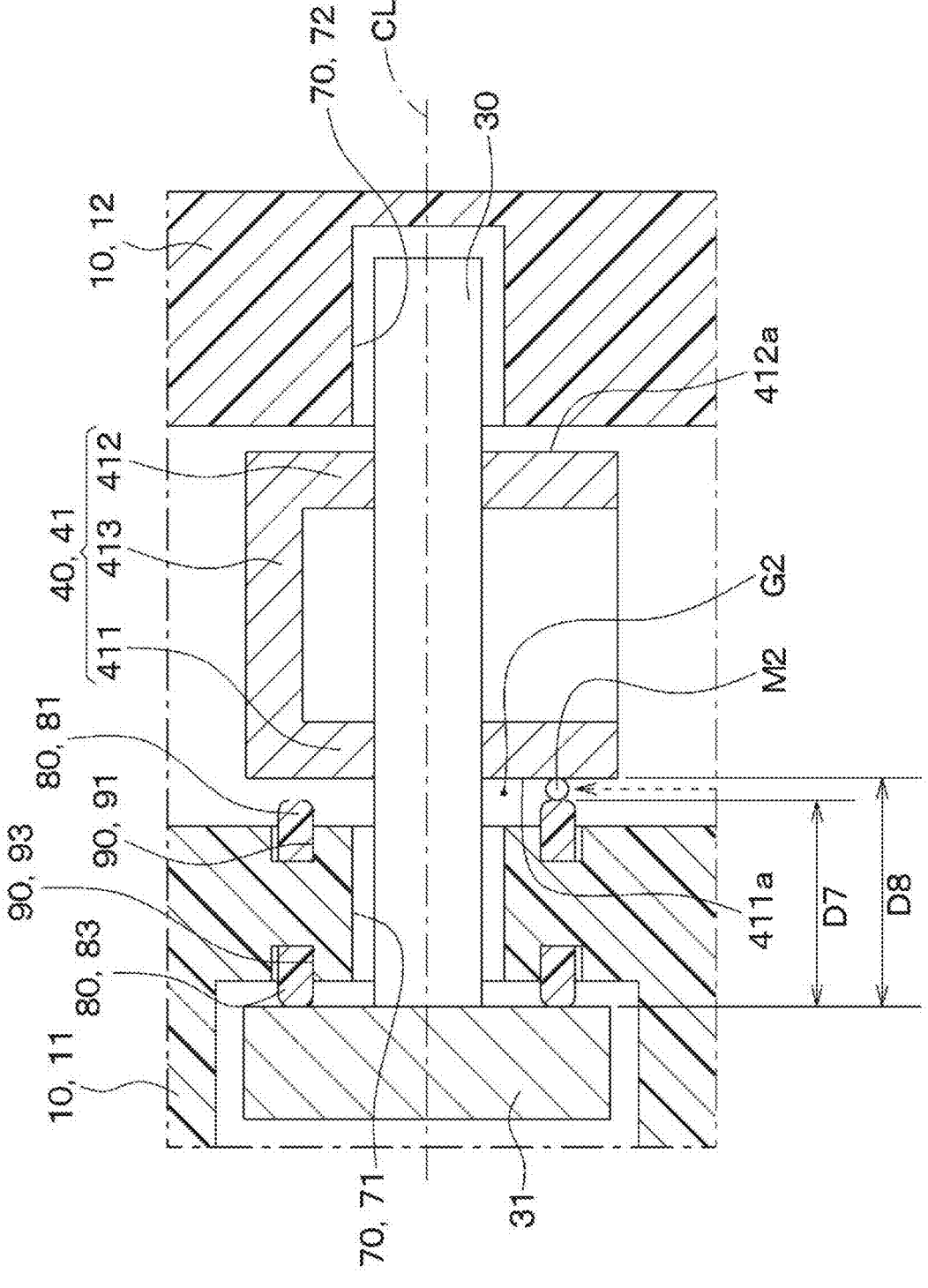
FIG. 20 is a cross-sectional view showing a portion corresponding to FIG. 5, in a brake pedal device according to a seventh embodiment.

As shown in FIG. 20, a brake pedal device 1 of the seventh embodiment includes a first restricting member 81 provided on the surface of a housing body 11 facing a brake pedal 40 as shown in FIG. 20. Further, the brake pedal device 1 of the seventh embodiment includes a third restricting member 83 provided on a surface of the housing body 11 facing away from the brake pedal 40. The brake pedal device 1 of the seventh embodiment does not include a second restricting member 82 described in the fourth and fifth embodiments.

The third restricting member 83 is formed in an annular shape, and is provided to surround a radial outside region of a shaft 30. The third restricting member 83 is capable of having sliding contact with a rotating body 31 provided on the shaft 30. Therefore, it can also be said that the third restricting member 83 is provided on a surface of the housing body 11 that faces the rotating body 31.

The rotating body 31 can be used, for example, as a sensor component that constitutes a part of a sensor device 60. Specifically, when an inductive sensor is employed as the sensor device 60, the rotating body 31 may be used as a target. Further, when a magnetic sensor is used as the sensor device 60, the rotating body 31 may be used as a magnetic circuit portion.

A third annular groove 93 into which the third restricting member 83 is fitted is provided on a surface of the housing body 11 facing the rotating body 31. The third annular groove 93 is provided to surround a radial outside region of the shaft 30. The third restricting member 83 is fixed to an inner wall of the third annular groove 93 by being press-fitted.

In the seventh embodiment, an axial movable range of the shaft 30 and the brake pedal 40 is restricted by the first restricting member 81 and the third restricting member 83.

A distance D7 between a surface of the first restricting member 81 facing the brake pedal 40 and a surface of the third restricting member 83 facing the rotating body 31 is greater than a distance D8 between the brake pedal 40 and the rotating body 31 in the axial direction. Therefore, a predetermined gap G2 is provided at a position between the brake pedal 40 and the surface of the first restricting member 81 that faces the brake pedal 40, allowing the brake pedal 40 and the shaft 30 to rotate around the axis with respect to the restricting member 80. Alternatively, the predetermined gap G2 is provided at a position between the surface of the third restricting member 83 facing the rotating body 31 and the rotating body 31, allowing the brake pedal 40 and the shaft 30 to rotate around the axis with respect to the restricting member 80. Therefore, the brake pedal 40 is movable in the axial direction in the range of the predetermined gap G2.

For convenience of explanation, FIG. 20 shows a state in which the third restricting member 83 and the rotating body 31 are in contact and the gap G2 is created at a position between the first side plate 411 of the brake pedal 40 and the first restricting member 81. The gap G2 is set so as not to disappear even when the restricting member 80, the housing 10, the brake pedal 40, or the like expand and contract due to changes in the environmental temperature. Therefore, in such brake pedal device 1, the feeling of the pedaling force when the driver depresses the brake pedal 40 does not change and remains constant regardless of changes in the environmental temperature.

However, by providing the gap G2 at a position between the first restricting member 81 and the brake pedal 40, or between the third restricting member 83 and the rotating body 31, there is a tradeoff, as shown by the broken line arrow in FIG. 20, that there is a risk of the foreign matter M2 entering the gap G2. The foreign matter M2 is, for example, sand, dirt, or the like. When the first restricting member 81 and the brake pedal 40 or the third restricting member 83 and the rotating body 31 become stuck and do not rotate due to the foreign matter M2 being caught in between, the driver cannot depress and operate the brake pedal 40, posing a concern that a problem with vehicle braking may be caused.

On the other hand, in the brake pedal device 1 of the seventh embodiment, as in the fourth to sixth embodiments, it is configured that, when the driver depresses the brake pedal 40, a predetermined torque is applied to release the fixation between the inner wall of the annular groove 90 in the housing 10 and the restricting member 80. Specifically, fixation between the inner wall of the first annular groove 91 in the housing body 11 and the first restricting member 81, and fixation between the inner wall of the third annular groove 93 in the housing body 11 and the third restricting member 83 is configured to be releasable by the predetermined torque described in the fourth and fifth embodiments. Therefore, the brake pedal device 1 of the seventh embodiment can also achieve the same effects as the fourth to sixth embodiments.

Eighth Embodiment

The eighth embodiment of the present disclosure will be described in the following. The eighth embodiment differs from the fourth and fifth embodiments in that the configuration of a brake pedal 40 is changed, and other aspects are the same as in the fourth and fifth embodiments. Thus, only the parts different from the fourth and fifth embodiments will be explained.

Figure 21:
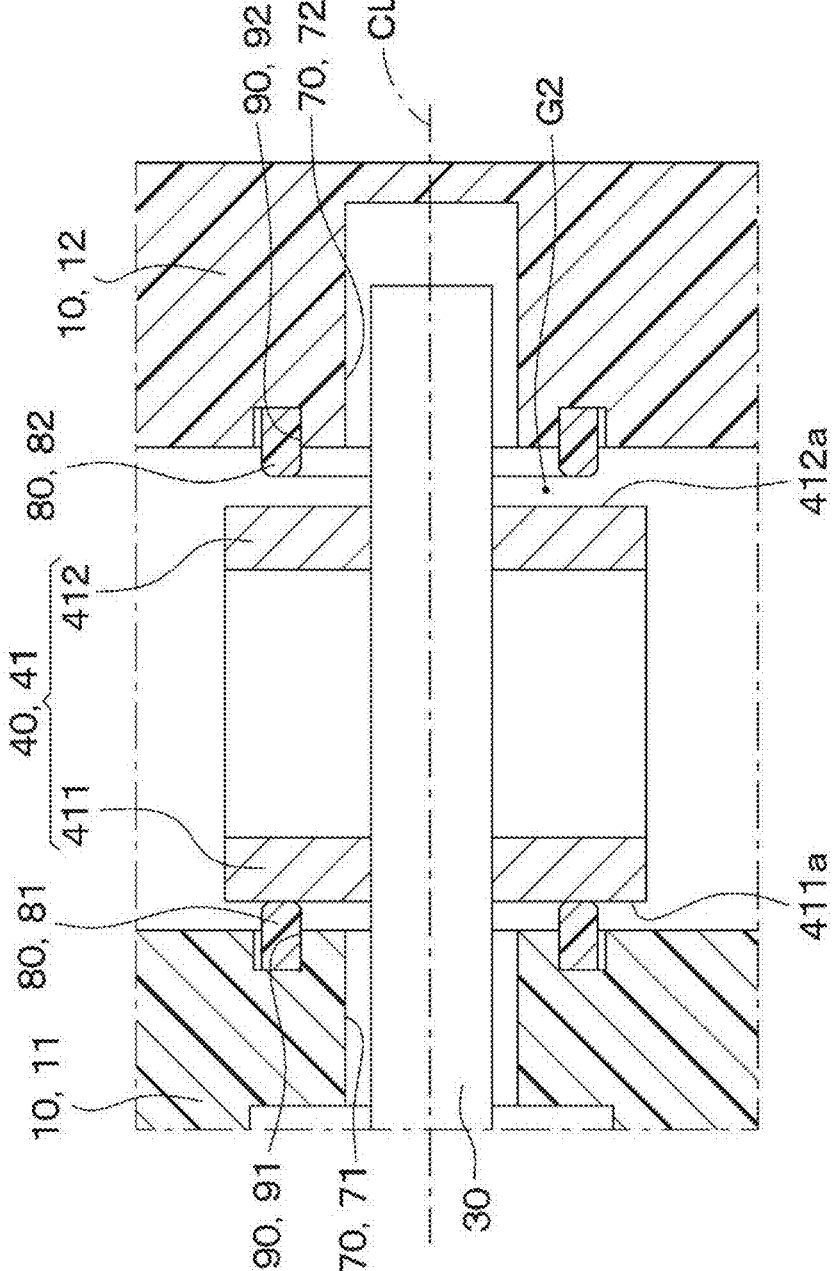
FIG. 21 is a cross-sectional view showing a portion corresponding to FIG. 5, in a brake pedal device according to an eighth embodiment.

As shown in FIG. 21, in a brake pedal device 1 of the eighth embodiment, a pedal arm 41 of a brake pedal 40 has a first side plate 411 and a second side plate 412 at least at a portion connected to a shaft 30, and does not have a top plate 413. Even in such a configuration, the axial movable range of the shaft 30 and the brake pedal 40 is restricted by the first restricting member 81 and the second restricting member 82. Therefore, the brake pedal device 1 of the eighth embodiment can also have the same effects as the fourth and fifth embodiments.

Ninth Embodiment

The ninth embodiment of the present disclosure will be described in the following. The ninth embodiment differs from the first to third embodiments in that a method of fixing the tubular member 20 and the housing 10 is changed, and other aspects are the same as the first to third embodiments. Thus, only the parts that are different from the first to third embodiments will be explained.

Figure 22:
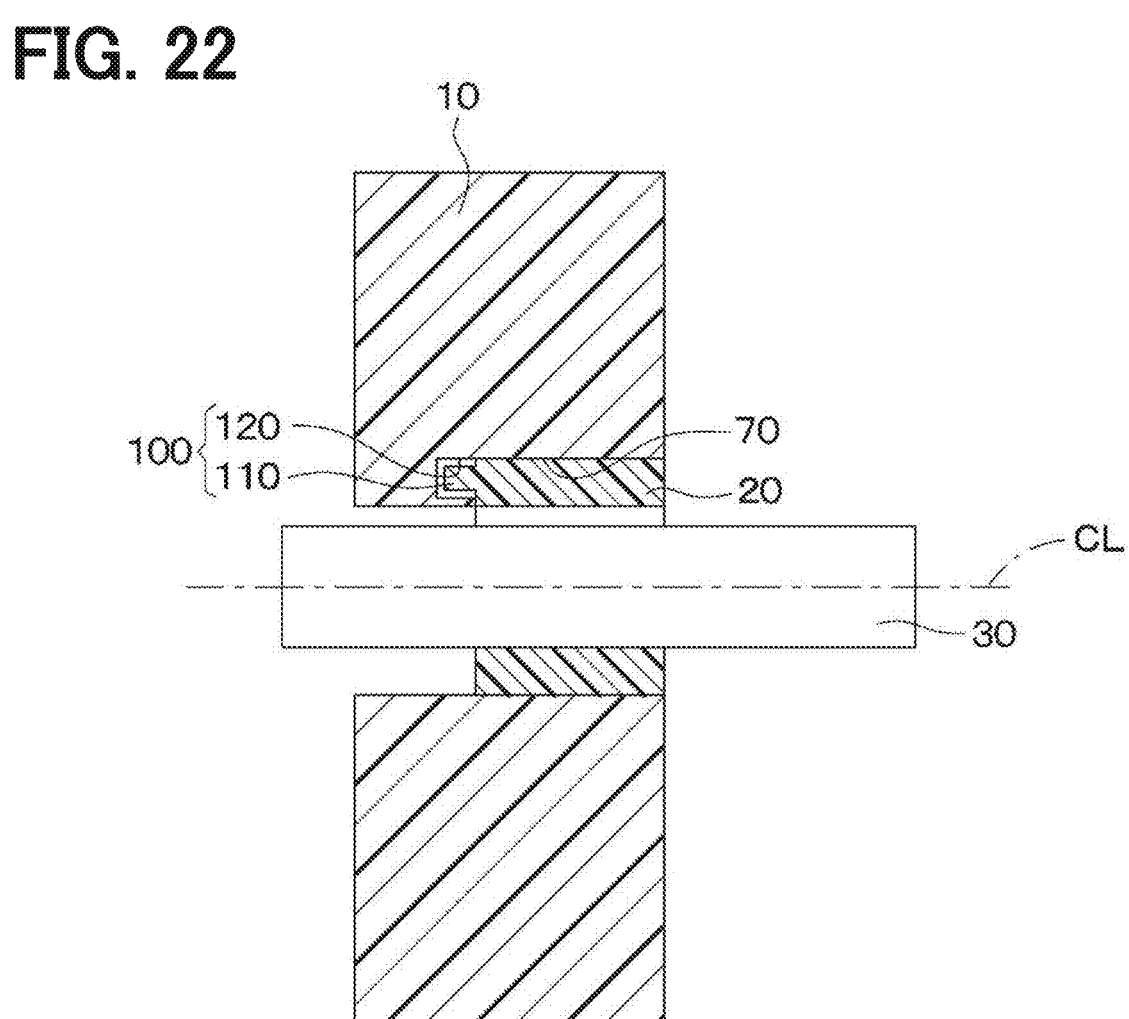
FIG. 22 is a cross-sectional view showing a tubular member fixed to a hole portion in a housing of a brake pedal device according to a ninth embodiment.
Figure 23:
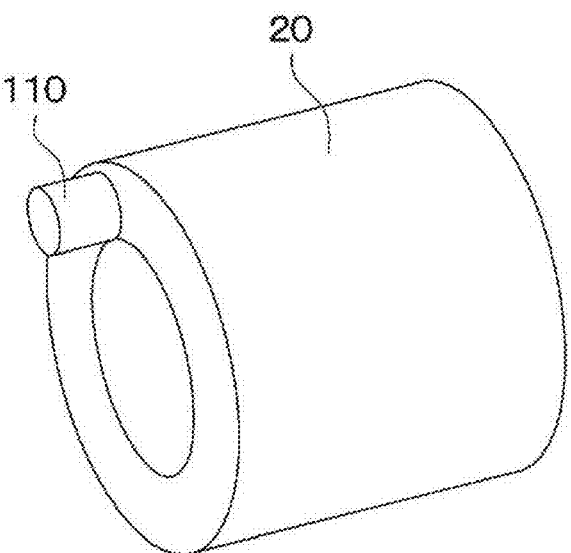
FIG. 23 is a perspective view showing a tubular member included in the brake pedal device according to the ninth embodiment.

As shown in FIGS. 22 and 23, a tubular member 20 included in a brake pedal device 1 of the ninth embodiment is fixed to a hole portion 70 provided in a housing 10 by a rotation restricting portion 100. The rotation restricting portion 100 restricts rotation of the tubular member 20 with respect to the inner wall of the hole portion 70. Specifically, in the ninth embodiment, the rotation restricting portion 100 includes a convex portion 110 protruding from a part of a surface of the tubular member 20 facing in the axial direction, and a concave portion 120 provided in the hole portion 70 of the housing 10. The convex portion 110 provided on the tubular member 20 is configured to fit into the concave portion 120 provided in the hole portion 70 of the housing 10. Thereby, rotation of the tubular member 20 with respect to the inner wall of the hole portion 70 in the housing 10 is restricted, and the inner wall of the hole portion 70 and the tubular member 20 are fixed to each other.

In the ninth embodiment, in case that the tubular member 20 and the shaft 30 are unintentionally stuck together, when a predetermined load is applied to the tread 43 of the pedal pad 42, it is configured that the rotation restricting portion 100 is damaged and the fixation between the inner wall of the hole portion 70 and the tubular member 20 is released. Specifically, it is configured that, when a predetermined load is applied to the tread 43 in a state where the tubular member 20 and the shaft 30 are stuck together, at least one of the convex portion 110 and the concave portion 120 constituting the rotation restricting portion 100 is damaged and the fixation between the inner wall of the hole portion 70 and the tubular member 20 is released. As mentioned above, in the specification of the present disclosure, damage includes destruction, deformation, displacement, or the like, and refers to a problem in the function of a damaged member or a change in the shape of the damaged member.

A torque of the pedaling force, causing the damage to the rotation restricting portion 100 when a predetermined load is applied to the tread 43 of the pedal pad 42 in a state where the tubular member 20 and the shaft 30 are stuck together (i.e., unfixing torque) is set to the same torque as explained in the first and second embodiments. That is, it is configured that the unfixing torque is set to the one that is the same as the unfixing torque being set when adopting the first, second or third configuration, as described above in the first and second embodiments. Specifically, the material, shape, size, and the like of at least one of the convex portion 110 and the concave portion 120 that constitute the rotation restricting portion 100 are adjusted.

The brake pedal device 1 of the ninth embodiment described above has the following configuration and the effects derivable therefrom.

(1) The brake pedal device 1 of the ninth embodiment includes the rotation restricting portion 100 on at least one of the inner wall of the hole portion 70 in the housing 10 and the outer wall of the tubular member 20 to restrict rotation of the tubular member 20 with respect to the inner wall of the hole portion 70. The rotation restricting portion 100 is configured to release the fixation between the inner wall of the hole portion 70 and the tubular member 20 by being damaged when a predetermined load is applied to the tread 43 of the pedal pad 42 in a state where the tubular member 20 and the shaft 30 are stuck together. By the way, as explained in the first to third embodiments, when the inner wall of the hole portion 70 provided in the fixed member and the tubular member 20 are fixed to each other by press-fitting, the unfixing torque may change, because the change in the environmental temperature causes a change in the press-fitting tension force. That is, the unfixing torque may become higher at low or high temperatures. On the other hand, in the ninth embodiment, the inner wall of the hole portion 70 in the housing 10 and the tubular member 20 are fixed to each other by the rotation restricting portion 100, and it is configured that, when a predetermined unfixing torque is applied, the rotation restricting portion 100 releases such a fixation. According to the above, it becomes possible to set the unfixing torque to be relatively small regardless of changes in the environmental temperature. Therefore, in such brake pedal device 1, even when the tubular member 20 and the shaft 30 are unintentionally stuck together, the driver can damage the rotation restricting portion 100 with a relatively small pedaling force, releasing the fixation between the inner wall of the hole portion 70 and the tubular member 20 and performing a pedaling operation of the brake pedal 40.

(2) In the ninth embodiment, the rotation restricting portion 100 includes the concave portion 120 provided on the inner wall of the hole portion 70 in the housing 10 and the convex portion 110 that protrudes from the outer wall of the tubular member 20 and fits into the concave portion 120. It is configured that, when a predetermined load is applied to the tread 43 of the pedal pad 42 in a state where the tubular member 20 and the shaft 30 are stuck together, at least one of the concave portion 120 and the convex portion 110 is damaged and the fixation between the inner wall of the hole portion 70 and the tubular member 20 is released. According to the above, it is possible to realize the rotation restricting portion 100 with a simplified configuration.

In the ninth embodiment, although the concave portion 120 provided on the inner wall of the hole portion 70 in the housing 10 and the convex portion 110 that protrudes from the outer wall facing the axis of the tubular member 20 and fits into the concave portion 120 are explained as an example of the rotation restricting portion 100, the rotation restricting portion 100 is not limited thereto. For example, the rotation restricting portion 100 may be configured by a concave portion provided on the outer wall of the tubular member 20, and a convex portion protruding from the inner wall of the hole portion 70 and fitting into the concave portion.

Further, the rotation restricting portion 100 is not limited to the above-mentioned fitting between the concave portion 120 and the convex portion 110, but can also be configured in various ways, such as welding, caulking, fitting, and locking between the housing 10 and the tubular member 20.

Tenth Embodiment

The tenth embodiment of the present disclosure will be described in the following. The tenth embodiment is different from the ninth embodiment in that the configuration of a rotation restriction portion 100 is changed, but the rest is similar to the ninth embodiment, so only the parts that are different from the ninth embodiment will be described.

Figure 24:
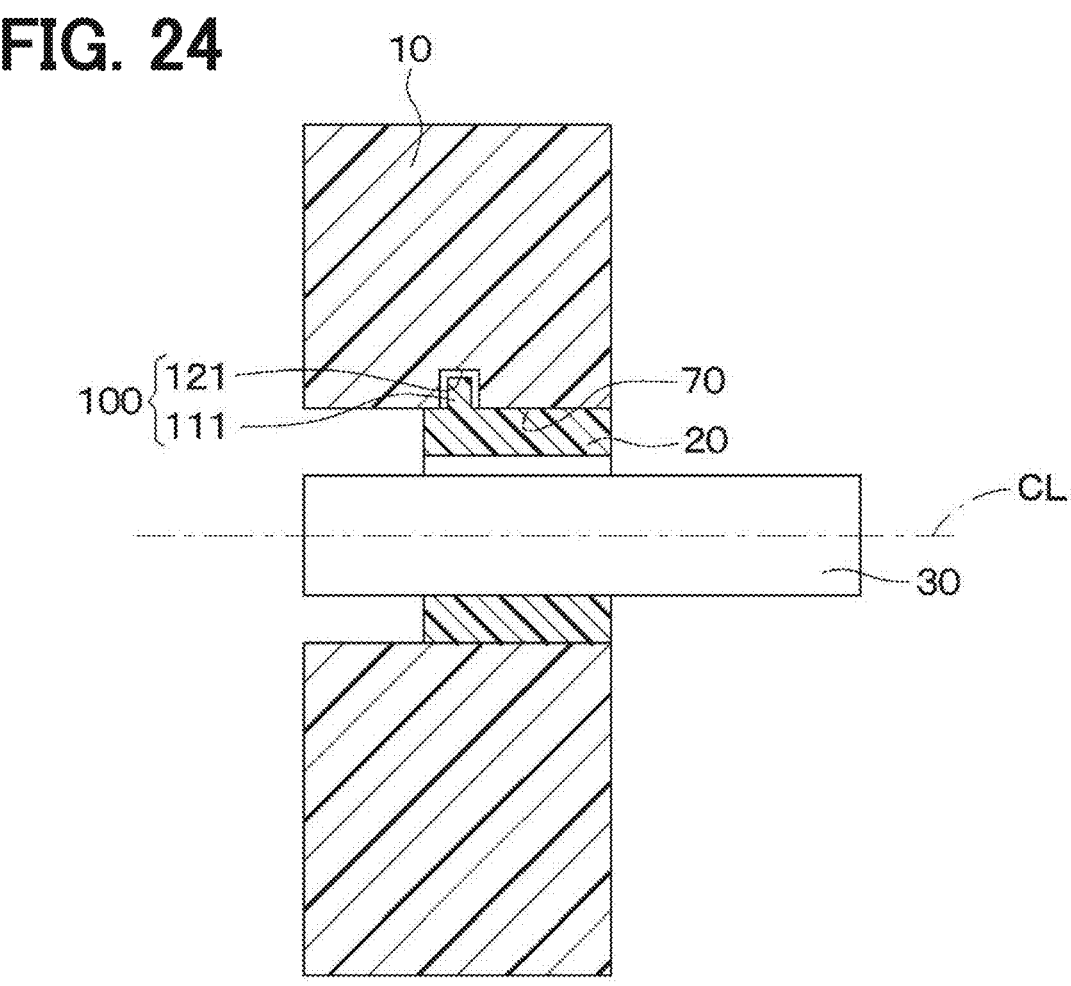
FIG. 24 is a cross-sectional view showing a tubular member fixed to a hole portion in a housing of a brake pedal device according to a tenth embodiment.
Figure 25:
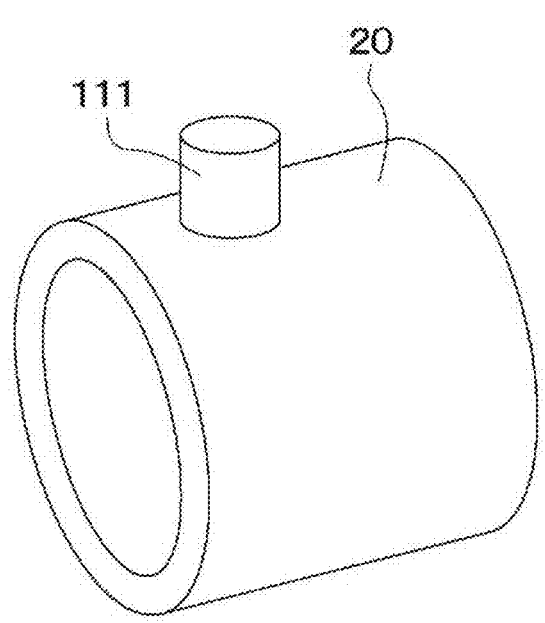
FIG. 25 is a perspective view showing a tubular member provided in the brake pedal device according to the tenth embodiment.

As shown in FIGS. 24 and 25, in the tenth embodiment, the rotation restricting portion 100 includes a convex portion 111 protruding from a part of a surface of the tubular member 20 facing outward in the radial direction, and a concave portion 121 provided in a hole portion 70 of the housing 10. The convex portion 111 provided on the tubular member 20 is configured to fit into the concave portion 121 provided in the hole portion 70 of the housing 10. Thereby, rotation of the tubular member 20 with respect to the inner wall of the hole portion 70 in the housing 10 is restricted, and the inner wall of the hole portion 70 and the tubular member 20 are fixed to each other.

Also in the tenth embodiment, in case that the tubular member 20 and the shaft 30 are unintentionally stuck together, when a predetermined load is applied to the tread 43 of the pedal pad 42, the rotation restricting portion 100 is damaged and the fixation between the inner wall of the hole portion 70 in the housing 10 is released. Specifically, it is configured that, when a predetermined load is applied to the tread 43 in a state where the tubular member 20 and the shaft 30 are stuck together, at least one of the convex portion 111 and the concave portion 121 constituting the rotation restricting portion 100 is damaged and the fixation between the inner wall of the portion 70 and the tubular member 20 is released.

The unfixing torque is set in the same manner as described in the first and second embodiments. That is, it is configured that the unfixing torque is set to the one that is the same as the unfixing torque being set when adopting the first, second or third configuration, as described above in the first and second embodiments. Specifically, the material, shape, size, and the like of at least one of the convex portion 111 and the concave portion 121 constituting the rotation restricting portion 100 are adjusted.

The brake pedal device 1 of the tenth embodiment described above also has the same effects as the ninth embodiment.

In the above description of the tenth embodiment, although, as an example of the rotation restricting portion 100, the convex portion 111 protruding from a part of the surface of the tubular member 20 facing outward in the radial direction and the concave portion 111 provided in the hole portion 70 of the housing 10 are explained, the rotation restriction portion 100 is not limited thereto. For example, the rotation restricting portion 100 may include a concave portion provided on a surface of the tubular member 20 facing outward in the radial direction and a convex portion protruding from the inner wall of the hole portion 70 in the housing 10 and fitting into the concave portion.

Eleventh Embodiment

The eleventh embodiment of the present disclosure will be described in the following. The eleventh embodiment differs from the fourth to eighth embodiments in that a method of fixing the restricting member 80 and the housing 10 is changed, and the other aspects are the same as the fourth to eighth embodiments, thereby only the parts that are different from the fourth to eighth embodiments will be explained.

Figure 26:
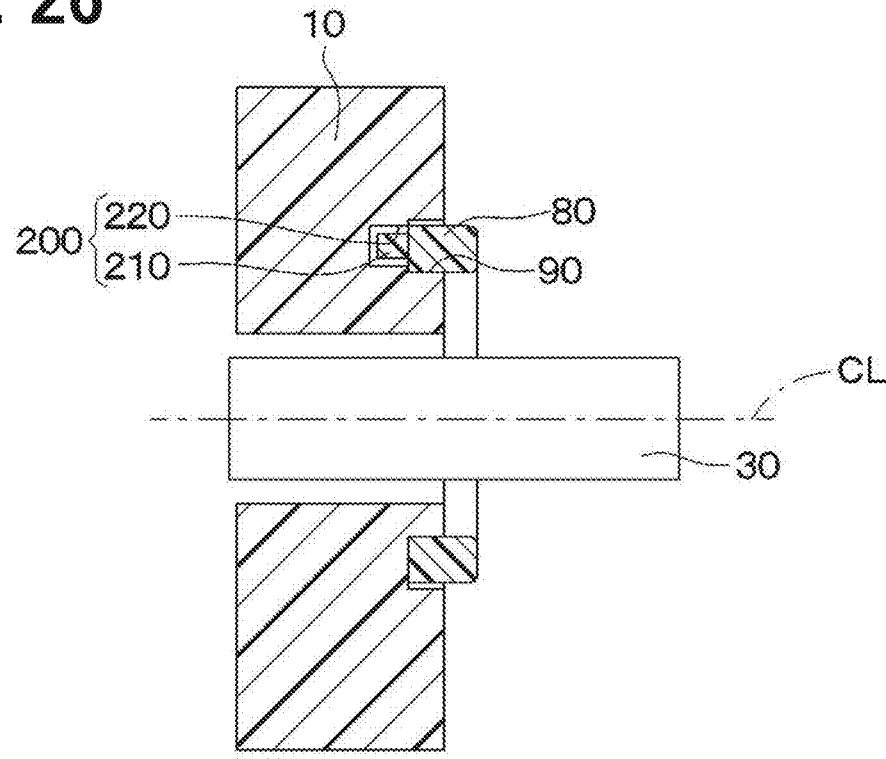
FIG. 26 is a cross-sectional view showing a restricting member fixed to an annular groove of a housing in a brake pedal device according to an eleventh embodiment.
Figure 27:
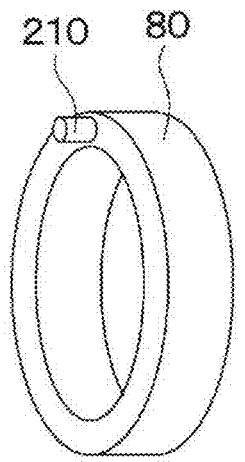
FIG. 27 is a perspective view of a restricting member provided in the brake pedal device according to the eleventh embodiment.

As shown in FIGS. 26 and 27, a restricting member 80 included in a brake pedal device 1 of the eleventh embodiment is fixed to an annular groove 90 provided in a housing 10 by a second rotation restricting portion 200. The second rotation restricting portion 200 restricts the rotation of the restricting member 80 with respect to the inner wall of the annular groove 90. Specifically, in the eleventh embodiment, the second rotation restricting portion 200 is provided in a second convex portion 210 that protrudes from a part of a surface of the restricting member 80 facing in the axis of a shaft 30, and a second concave portion 220 provided in the annular groove 90 in the housing 10. The second convex portion 210 provided on the restricting member 80 is configured to fit into the second concave portion 220 provided in the annular groove 90 in the housing 10. In such manner, rotation of the restricting member 80 around the axis is restricted with respect to the inner wall of the annular groove 90 in the housing 10, and the inner wall of the annular groove 90 and the restricting member 80 are fixed to each other.

In the eleventh embodiment, in case that the restricting member 80 and a brake pedal 40 are unintentionally stuck together, it is configured that, when a predetermined load is applied to the tread 43 of the brake pedal 40, the second rotation restricting portion 200 is damaged and the fixation between the annular groove 90 in the housing 10 and the restricting member 80 is released. Specifically, when a predetermined load is applied to the tread 43 in a state where the restricting member 80 and the brake pedal 40 are stuck together, at least one of the second convex portion 210 and the second concave portion 220 constituting the second rotation restricting portion 200 is damaged and the fixation between the inner wall of the annular groove 90 and the restricting member 80 is released.

The torque of the pedaling force (i.e., the thrust unfixing torque) that causes damage to the second rotation restricting portion 200 when a predetermined load is applied to the tread 43 of the pedal pad 42 in a state where the restricting member 80 and the brake pedal 40 are stuck together is, as described above in the fourth and fifth embodiments, set similar to the one in those embodiments. That is, the thrust unfixing torque is set to the same as the one in the description of the fourth and fifth embodiment, when adopting the fourth configuration, fifth configuration, and sixth configuration, for damaging the second rotation restricting portion 200. Specifically, the material, shape, size, and the like of at least one of the second convex portion 210 and the second concave portion 220 that constitute the second rotation restricting portion 200 are adjusted.

The brake pedal device 1 of the eleventh embodiment described above has the following configuration and the effects derivable therefrom.

(1) The brake pedal device 1 of the eleventh embodiment includes the second rotation restricting portion 200 provided on at least one of the inner wall of the annular groove 90 in the housing 10 and the outer wall of the restricting member 80, which restricts the rotation of the restricting member 80 with respect to the inner wall of the annular groove 90. The second rotation restricting portion 200 is configured to release the fixation between the inner wall of the annular groove 90 and the restricting member 80 by being damaged when a predetermined load is applied to the tread 43 of the pedal pad 42 in a state where the restricting member 80 and the brake pedal 40 are stuck together. By the way, as explained in the fourth to eighth embodiments, when the inner wall of the annular groove 90 provided in the housing 10 and the restricting member 80 are fixed to each other by press-fitting, the pressure-fitting tension force changes depending on the change in the environmental temperature, thereby possibly causing a change in the thrust unfixing torque. That is, the thrust unfixing torque may become higher at low temperatures or high temperatures. In contrast, in the eleventh embodiment, it is configured that the inner wall of the annular groove 90 in the housing 10 and the restricting member 80 are fixed to each other by the second rotation restricting portion 200, and such a fixation by the second rotation restricting portion 200 is released when a predetermined thrust unfixing torque is applied. In such manner, it is possible to set the thrust unfixing torque to a relatively small value regardless of changes in the environmental temperature. Therefore, in such brake pedal device 1, even when the restricting member 80 and the shaft 30 are unintentionally stuck together, the driver can damage the second rotation restricting portion 200 with a relatively small pedaling force, and the fixation between the inner wall of the annular groove 90 and the restricting member 80 is released and the brake pedal 40 can be depressed and operated.

(2) In the eleventh embodiment, the second rotation restricting portion 200 includes the second concave portion

220 provided on the inner wall of the annular groove 90 in the housing 10 and the second convex portion 210 protruding from the outer wall of the restricting member 80 and being fitted into the second concave portion 220. At least one of the second concave portion 220 and the second convex portion 210 is damaged when a predetermined load is applied to the tread 43 of the pedal pad 42 in a state where the restricting member 80 and the brake pedal 40 are stuck together, and the fixation between the inner wall of the annular groove 90 and the restricting member 80 is released. In such manner, it is possible to realize the second rotation restricting portion 200 with a simplified configuration.

In the eleventh embodiment, as an example of the second rotation restricting portion 200, the second concave portion 220 provided on the inner wall of the annular groove 90 in the housing 10 and the second convex portion 210 protruding from the outer wall of the restricting member 80 facing the axis of the shaft 30 are explained. However, the second rotation restricting portion 200 is not limited to the above. For example, the second rotation restricting portion 200 may be configured by the second concave portion provided on the outer wall of the restricting member 80 facing the axis, and the second convex portion protruding from the inner wall of the annular groove 90 and fitting into the second concave portion.

Further, the second rotation restricting portion 200 is not limited to the above-described fitting between the second concave portion 220 and the second convex portion 210, but may be variously configured as welding, caulking, fitting, and locking between the housing 10 and the restricting member 80, or the like.

Twelfth Embodiment

The twelfth embodiment of the present disclosure will be described in the following. The twelfth embodiment differs from the eleventh embodiment in the configuration of the second rotation restricting portion 200, and is otherwise the same as the eleventh embodiment, so only the parts that differ from the eleventh embodiment are the same. explain.

Figure 28:
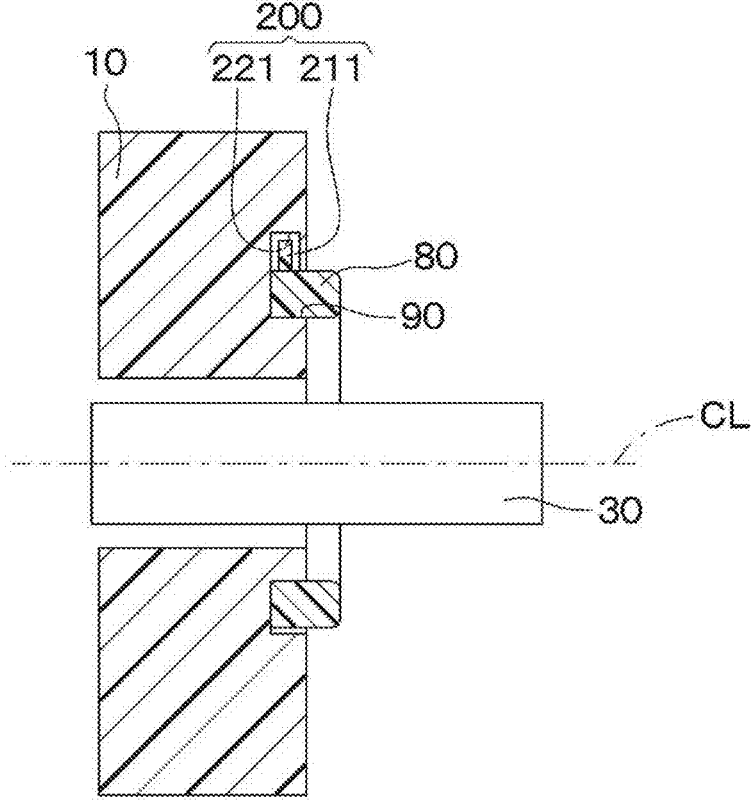
FIG. 28 is a cross-sectional view showing a restricting member fixed to an annular groove of a housing in a brake pedal device according to a twelfth embodiment.
Figure 29:
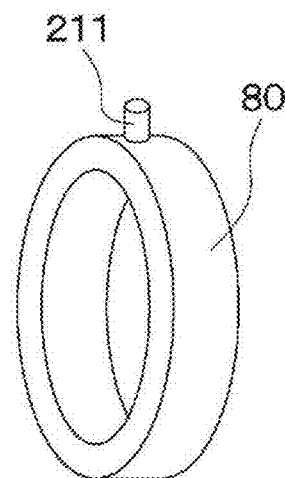
FIG. 29 is a perspective view showing a restricting member provided in the brake pedal device according to the twelfth embodiment.

As shown in FIGS. 28 and 29, in the twelfth embodiment, the second rotation restricting portion 200 includes a second convex portion 211 that protrudes from a part of a surface of a restricting member 80 facing radially outward, and a second concave portion 221 provided in an annular groove 90 of a housing 10. The second convex portion 211 provided on the restricting member 80 is configured to fit into a second concave portion 221 provided in the annular groove 90 in the housing 10. In such manner, rotation of the restricting member 80 is restricted with respect to the inner wall of the annular groove 90 in the housing 10, and the inner wall of the annular groove 90 and the restricting member 80 are fixed to each other.

Even in the twelfth embodiment, in case that the restricting member 80 and the shaft 30 become unintentionally stuck together, when a predetermined load is applied to a tread 43 of a pedal pad 42, the second rotation restricting portion 200 is damaged, and the fixation between the inner wall of the annular groove 90 in the housing 10 and the restricting member 80 is released. Specifically, at least one of the second convex portion 211 and the second concave portion 221 that constitute the second rotation restricting portion 200 is damaged upon having an application of a predetermined load to the tread 43 in a state where the restricting member 80 and the brake pedal 40 are stuck together, and the fixation between the inner wall of the annular groove 90 and the restricting member 80 is released.

The thrust unfixing torque is set in the same manner as described in the fourth and fifth embodiments. That is, the thrust unfixing torque is set to the same as the one in the description of the fourth and fifth embodiment, when adopting the fourth configuration, fifth configuration, and sixth configuration, for damaging the second rotation restricting portion 200. Specifically, the material, shape, size, and the like of at least one of the second convex portion 211 and the second concave portion 221 that constitute the second rotation restricting portion 200 are adjusted.

A brake pedal device 1 of the twelfth embodiment described above also achieves the same effects as those of the eleventh embodiment.

In the twelfth embodiment, although the second convex portion 211 protruding from a part of the surface of the restricting member 80 facing outward in the radial direction, and a second convex portion 211 provided in the annular groove 90 in the housing 10 are explained as an example of the second rotation restricting portion 200, the second rotation restriction portion 200 is not limited thereto. For example, the second rotation restricting portion 200 may be configured to include a second concave portion provided on a surface of the restricting member 80 facing outward in the radial direction and a second convex portion that protrudes from the inner wall of the annular groove 90 in the housing 10 and fits into the second concave portion.

Thirteenth Embodiment

The thirteenth embodiment of the present disclosure will be described in the following. The thirteenth embodiment is a combination of the first and fourth embodiments.

Figure 30:
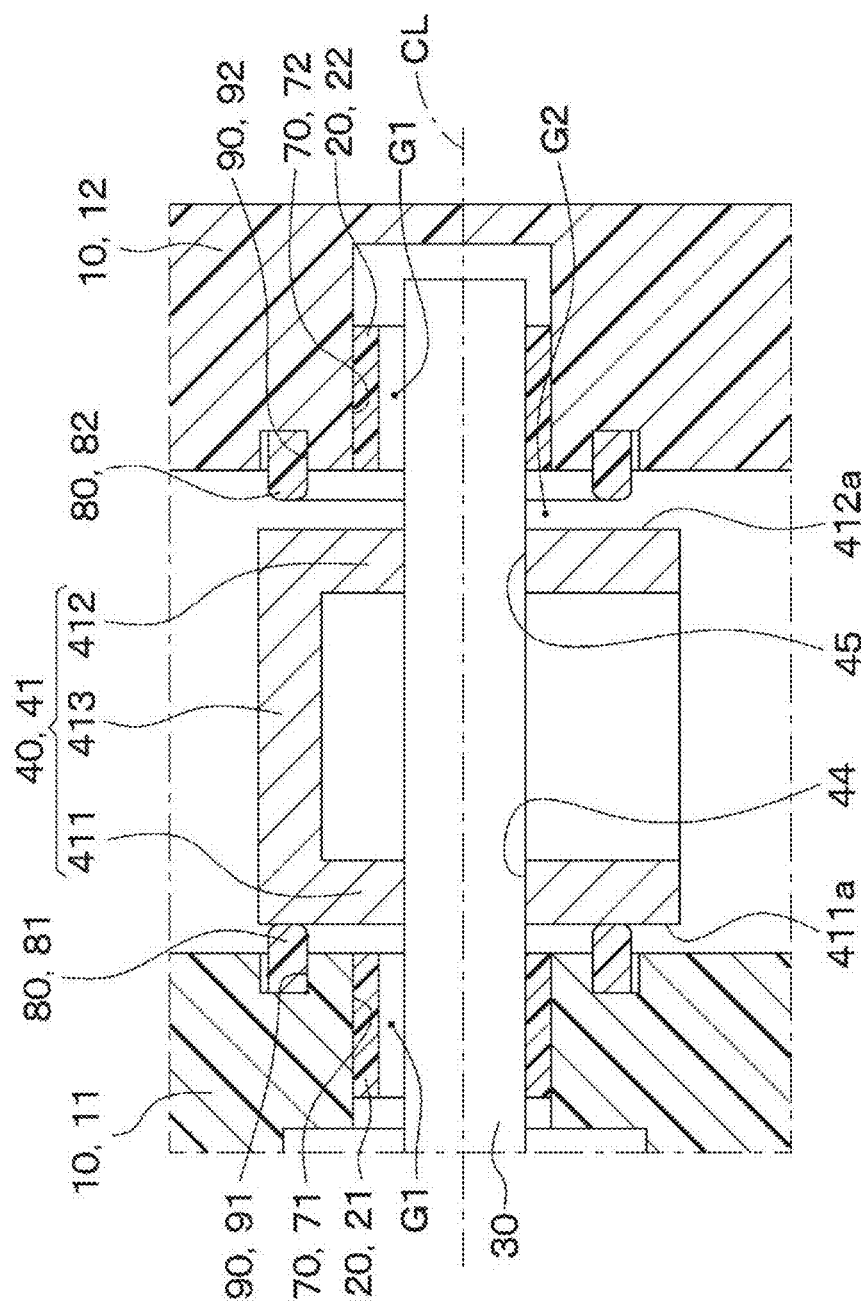
FIG. 30 is a cross-sectional view showing a portion corresponding to FIG. 5 in the brake pedal device according to a thirteenth embodiment.

As shown in FIG. 30, a brake pedal device 1 of the twelfth embodiment includes a tubular member 20 and a restricting member 80. The tubular member 20 is provided at a position between the inner wall of the hole portion 70 in a housing 10 and the shaft 30. The restricting member 80 is provided at a position between a side plate of a brake pedal 40 and the housing 10 to surround a region outside the shaft 30 in the radial direction. The configurations of the tubular member 20 and the restricting member 80 are the same as those described in the first embodiment and the fourth embodiment, respectively.

As illustrated in the thirteenth embodiment, the brake pedal device 1 can be configured to include both of the tubular member 20 and the restricting member 80. In the thirteenth embodiment, a combination of the first and fourth embodiments has been exemplified, but the above-described embodiments and partial combinations thereof are not limited to such an example. That is, the embodiments and parts thereof described above are not unrelated to each other, and can be appropriately combined even when not shown in the drawings, unless a combination is clearly impossible.

OTHER EMBODIMENTS (1) In each of the above-described embodiments, the brake pedal device 1 has been described as being used in a complete brake-by-wire system 2, but the present disclosure is not limited to the above. The brake pedal device 1 may be used in the brake-by-wire system 2 in which a component of a brake mechanism 4 (e.g., a master cylinder) and a brake pedal 40 are mechanically connected. In such case, since the brake pedal 40 receives a hydraulic reaction force from the master cylinder of the brake mechanism 4, it is possible to omit the reaction force generating mechanism 50.

(2) In each of the above-described embodiments, as the brake pedal device 1, a so-called pendant-type device, in which a part of the brake pedal 40 operated by a foot of a driver is disposed below the axis of rotation CL in the direction of gravity when mounted on a vehicle, has been exemplified. However, the brake pedal device 1 is not limited to the above. For example, the brake pedal device 1 may be of a so-called organ-type in which a part of the brake pedal 40 that is operated by a foot of a driver is disposed above the axis of rotation CL in the direction of gravity when mounted on a vehicle.

(3) In each of the above-described embodiments, the fixed member included in the brake pedal device 1 is described as the housing 10. However, the fixed member is not limited to the above, and may be a pressed product such as a bracket.

The present disclosure is not limited to the above-described embodiments, and can be appropriately modified. Further, individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. A shape, positional relationship or the like of a structural element, which is referred to in the embodiments described above, is not limited to the described shape, positional relationship or the like, unless it is specifically described or obviously necessary to be limited in principle.

Features of the present disclosure are shown below.

[Viewpoint 1]

A brake pedal device to be mounted on a vehicle, the brake pedal device comprising:

a fixed member (10, 11, 12) to be fixed directly or indirectly to a vehicle body;

a shaft (30) supported by an inside of a hole portion (70, 71, 72) provided in the fixed member, and provided about a predetermined axis (CL) with respect to the fixed member;

a brake pedal (40) fixed to the shaft and operated in a predetermined angular range around the axis of the shaft when being depressed by a driver; and a tubular member (20, 21, 22) provided at a position between an inner wall of the hole portion and the shaft, wherein a predetermined gap (G1) is provided between the inner wall of the tubular member on a radial inside and the shaft, to allow the shaft to rotate around the axis with respect to the tubular member, the tubular member and the inner wall of the hole portion provided in the fixed member are fixed to each other, and when a load is applied to a predetermined position of the brake pedal where the driver is capable of applying a pedaling force in a stuck state where the tubular member and the shaft are stuck together, a torque that releases fixation between the inner wall of the hole portion and the tubular member in the stuck state is greater than 0, and is smaller than a damaging torque of the load applied to the predetermined position of the brake pedal in the stuck state, which damages at least one of the fixed member, the shaft, the brake pedal, or at least one of connection points therebetween.

[Viewpoint 2]

The brake pedal device of viewpoint 1, wherein the torque that releases the fixation between the inner wall of the hole portion and the tubular member when the load is applied to the predetermined position in the stuck state where the tubular member and the shaft are stuck together, is greater than 0, and is smaller than a torque at which the brake pedal reaches a maximum stroke position on a depression side when the load is applied to the predetermined position in a non-stuck state where the tubular member and the shaft are not stuck together.

[Viewpoint 3]

The brake pedal device of viewpoint 1 or 2 further comprising:

an elastic member (51) provided in an operation range of the brake pedal, from a midway position between an initial position, at which the pedaling force of the driver is not applied to the brake pedal, and the maximum stroke position on the depression side, to the maximum stroke position on the depression side, wherein the torque that releases the fixation between the inner wall of the hole portion and the tubular member when the load is applied to the predetermined position in the stuck state where the tubular member and the shaft are stuck together is greater than 0, and is smaller than a torque at which the brake pedal reaches a position where the brake pedal contacts the elastic member when the load is applied to the predetermined position in the non-stuck state where the tubular member and the shaft are not stuck together.

[Viewpoint 4]

The brake pedal device of any one of viewpoints 1 to 3, wherein the inner wall of the hole portion provided in the fixed member and the tubular member are fixed to each other by press-fitting.

[Viewpoint 5]

The brake pedal device of any one of viewpoints 1 to 3 further comprising:

a rotation restricting portion (100) provided on at least one of the inner wall of the hole portion and an outer wall of the tubular member, to restrict rotation of the tubular member with respect to the inner wall of the hole portion, wherein the rotation restricting portion is configured to be damaged when a predetermined load is applied to the predetermined position in the stuck state where the tubular member and the shaft are stuck together, and to release the fixation between the inner wall of the hole portion and the tubular member.

[Viewpoint 6]

The brake pedal device of viewpoint 5, wherein the rotation restricting portion includes: a concave portion (120) provided on one of the inner wall of the hole portion and the outer wall of the tubular member; and a convex portion (110) protruding from an another one of the inner wall of the hole portion and the outer wall of the tubular member, and fitting into the concave portion, and at least one of the concave portion and the convex portion is configured to be damaged when the predetermined load is applied to the predetermined position in the stuck state where the tubular member and the shaft are stuck together, and to release the fixation between the inner wall of the hole portion and the tubular member.

[Viewpoint 7]

A brake pedal device to be mounted on a vehicle, the brake pedal device comprising:

a fixed member (10, 11, 12) to be fixed directly or indirectly to a vehicle body;

a shaft (30) supported by an inside of a hole portion (70, 71, 72) provided in the fixed member, and provided to be rotatable about a predetermined axis (CL) with respect to the fixed member;

a brake pedal (40) fixed to the shaft to surround a radial outside region of the shaft, and configured to move in a predetermined angular range around the axis of the shaft when being depressed by a driver; and a restricting member (80, 81, 82) provided to surround a radial outside region of the shaft at a position between a surface (411a, 412a) of the brake pedal facing in an axial direction and the fixed member, and to restrict a movable range of the shaft and the brake pedal in the axial direction, wherein a predetermined gap (G2) is provided at a position between the surface of the brake pedal facing in the axial direction and the restricting member, to cause the shaft and the brake pedal to rotate around the axis with respect to the restricting member, the fixed member and the restricting member are fixed to each other, and a torque that releases fixation between the inner wall of the hole portion and the tubular member when a load is applied to a predetermined position of the brake pedal in which the driver is capable of applying a pedaling force in a stuck state where the restricting member and the brake pedal are stuck together, is greater than 0, and is smaller than a damaging torque that damages at least one of the fixed member, the shaft, the brake pedal, or at least one of connection points therebetween when the load is applied to the predetermined position of the brake pedal in the stuck state.

[Viewpoint 8]

The brake pedal device of viewpoint 7, wherein the torque that releases the fixation between the fixed member and the restricting member when the load is applied to the predetermined position in the stuck state where the restricting member and the brake pedal are stuck together is greater than 0, and is smaller than a torque at which the brake pedal reaches a maximum stroke position on a depression side when the load is applied to the predetermined position in a non-stuck state where the restricting member and the brake pedal are not stuck together.

[Viewpoint 9]

The brake pedal device of viewpoint 7 or 8, further comprising:

an elastic member (51) provided in an operation range of the brake pedal, from a midway position between an initial position at which the pedaling force of the driver is not applied to the brake pedal and the maximum stroke position on the depression side, to the maximum stroke position on the depression side, wherein the torque that releases the fixation between the fixed member and the restricting member when the load is applied to the predetermined position in the stuck state where the restricting member and the brake pedal are stuck together is greater than 0, and is smaller than the torque at which the brake pedal reaches a position where the brake pedal contacts the elastic member when the load is applied to the predetermined position in the non-stuck state where the restricting member and the brake pedal are not stuck together.

[Viewpoint 10]

The brake pedal device of any one of viewpoints 7 to 9, wherein the fixed member and the restricting member are fixed to each other by press-fitting the restricting member into an annular groove (90, 91, 92) that is provided in the fixed member to surround an outer periphery of the shaft.

[Viewpoint 11]

The brake pedal device of any one of viewpoints 7 to 9 further comprising:

a second rotation restricting portion (200) provided on at least one of the fixed member and the restricting member to restrict a rotation of the restricting member around the axis with respect to the fixed member, wherein the second rotation restricting portion is configured to be damaged when a predetermined load is applied to the predetermined position in a state where the restricting member and the brake pedal are stuck together, and to release the fixation between the fixed member and the restricting member.

[Viewpoint 12]

The brake pedal device of viewpoint 11, wherein the second rotation restricting portion includes a second concave portion (220) provided on one of the fixed member or the restricting member, and a second convex portion (210) protruding from an another one of the fixed member or the restricting member and fitting into the second concave portion, and wherein at least one of the second concave portion and the second convex portion is configured to be damaged when the predetermined load is applied to the predetermined position in a state where the restricting member and the brake pedal are stuck together, and to release the fixation between the fixed member and the restricting member.

What is claimed is:

1. A brake pedal device to be mounted on a vehicle, the brake pedal device comprising:

a fixed member to be fixed directly or indirectly to a vehicle body;

a shaft supported by an inside of a hole portion that is provided in the fixed member, and provided to be rotatable about a predetermined axis with respect to the fixed member;

a brake pedal fixed to the shaft and operated in a predetermined angular range around the axis of the shaft when being depressed by a driver; and a tubular member provided at a position between an inner wall of the hole portion and the shaft, wherein a predetermined gap is provided between the inner wall of the tubular member on a radial inside and the shaft, to allow the shaft to rotate around the axis with respect to the tubular member, the tubular member and the inner wall of the hole portion provided in the fixed member are fixed to each other, and are configured to be released by a release torque in a stuck state where the tubular member and the shaft are stuck together, and when a load is applied to a predetermined position of the brake pedal where the driver is capable of applying a pedaling force in the stuck state, the release torque that releases fixation between the inner wall of the hole portion and the tubular member in the stuck state is greater than 0, and is smaller than a damaging torque which damages at least one of the fixed member, the shaft, the brake pedal, or at least one of connection points therebetween.

2. The brake pedal device of claim 1, wherein the release torque, which releases the fixation between the inner wall of the hole portion and the tubular member when the load is applied to the predetermined position in the stuck state, is greater than 0, and is smaller than a torque at which the brake pedal reaches a maximum stroke position on a depression side when the load is applied to the predetermined position in a non-stuck state where the tubular member and the shaft are not stuck together.

3. The brake pedal device of claim 1 further comprising:

an elastic member provided in an operation range of the brake pedal, from a midway position between an initial position, at which the pedaling force of the driver is not applied to the brake pedal, and the maximum stroke position on the depression side, to the maximum stroke position on the depression side, wherein the release torque that releases the fixation between the inner wall of the hole portion and the tubular member when the load is applied to the predetermined position in the stuck state is greater than 0, and is smaller than a torque at which the brake pedal reaches a position where the brake pedal contacts the elastic member when the load is applied to the predetermined position in the non-stuck state.

4. The brake pedal device of claim 1, wherein the inner wall of the hole portion provided in the fixed member and the tubular member are fixed to each other by press-fitting.

5. A brake pedal device to be mounted on a vehicle, the brake pedal device comprising:

a fixed member to be fixed directly or indirectly to a vehicle body;

a shaft supported by an inside of a hole portion that is provided in the fixed member, and provided to be rotatable about a predetermined axis with respect to the fixed member;

a brake pedal fixed to the shaft and operated in a predetermined angular range around the axis of the shaft when being depressed by a driver; and a tubular member provided at a position between an inner wall of the hole portion and the shaft, wherein a predetermined gap is provided between the inner wall of the tubular member on a radial inside and the shaft, to allow the shaft to rotate around the axis with respect to the tubular member, the tubular member and the inner wall of the hole portion provided in the fixed member are fixed to each other, and are configured to be released by a release torque in a stuck state where the tubular member and the shaft are stuck together, the brake pedal device further comprises:

a rotation restricting portion provided on at least one of the inner wall of the hole portion and an outer wall of the tubular member, to restrict a rotation of the tubular member with respect to the inner wall of the hole portion, and the rotation restricting portion is configured to be damaged and to release the fixation between the inner wall of the hole portion and the tubular member, when a predetermined load is applied to the predetermined position in the stuck state.

6. The brake pedal device of claim 5, wherein the rotation restricting portion includes:

a concave portion provided on one of the inner wall of the hole portion and the outer wall of the tubular member; and a convex portion protruding from an another one of the inner wall of the hole portion and the outer wall of the tubular member, and fitting into the concave portion, and at least one of the concave portion or the convex portion is configured to be damaged when the predetermined load is applied to the predetermined position in the stuck state, and to release the fixation between the inner wall of the hole portion and the tubular member.

* * * * *